United States Patent
Imanishi et al.

(10) Patent No.: US 11,440,292 B2
(45) Date of Patent: Sep. 13, 2022

(54) POLYPROPYLENE FILM, METAL LAYER LAMINATED FILM, AND FILM CAPACITOR

(71) Applicant: Toray Industries, Inc., Tokyo (JP)

(72) Inventors: Yasuyuki Imanishi, Otsu (JP); Masatoshi Ohkura, Otsu (JP); Yuta Nakanishi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 162 days.

(21) Appl. No.: 16/641,163

(22) PCT Filed: Aug. 27, 2018

(86) PCT No.: PCT/JP2018/031548
§ 371 (c)(1),
(2) Date: Feb. 21, 2020

(87) PCT Pub. No.: WO2019/044758
PCT Pub. Date: Mar. 7, 2019

(65) Prior Publication Data
US 2020/0198298 A1    Jun. 25, 2020

(30) Foreign Application Priority Data

Aug. 29, 2017  (JP) .............................. JP2017-164178
Aug. 29, 2017  (JP) .............................. JP2017-164179

(51) Int. Cl.
| | | |
|---|---|---|
| *B32B 15/08* | (2006.01) | |
| *H01G 4/18* | (2006.01) | |
| *H01G 4/32* | (2006.01) | |
| *H01G 4/33* | (2006.01) | |

(52) U.S. Cl.
CPC .............. *B32B 15/08* (2013.01); *H01G 4/18* (2013.01); *H01G 4/32* (2013.01); *H01G 4/33* (2013.01)

(58) Field of Classification Search
CPC ......... B32B 15/08; B32B 27/32; B32B 27/08; B32B 2323/10; H01G 4/18; H01G 4/32; H01G 4/33; C08J 2423/20; C08J 2323/12; C08J 5/18
See application file for complete search history.

(56) References Cited

U.S. PATENT DOCUMENTS

| | | | |
|---|---|---|---|
| 6,071,598 A | 6/2000 | Peiffer et al. | |
| 2006/0171100 A1* | 8/2006 | Uematsu | H01G 4/18 361/323 |
| 2009/0219672 A1* | 9/2009 | Masuda | H01M 50/411 361/502 |
| 2016/0002641 A1 | 1/2016 | Teruo et al. | |

FOREIGN PATENT DOCUMENTS

| | | | |
|---|---|---|---|
| JP | 09-001654 A | 1/1997 | |
| JP | 09-270361 A | 10/1997 | |
| JP | 2014-030974 A | 2/2014 | |
| JP | 2014-55276 A | 3/2014 | |
| JP | 2014-114419 A | 6/2014 | |
| JP | 2016-191059 A | 11/2016 | |
| WO | 2009/060944 A1 | 5/2009 | |
| WO | 2014/148547 A1 | 9/2014 | |
| WO | WO-2015129851 A1 * | 9/2015 | ............ B32B 27/32 |
| WO | 2016/043217 A1 | 3/2016 | |
| WO | WO-2016043217 A1 * | 3/2016 | ............ C08L 23/12 |
| WO | 2016/182003 A1 | 2/2018 | |
| WO | 2018/147335 A1 | 8/2018 | |

OTHER PUBLICATIONS

Motonobu, Kawai, "Film Capacitor Breakthrough, from Car to Energy," *Nikkei Electronics*, Nikkei BP, Sep. 17, 2012, pp. 57-62, along with an English Summary.

* cited by examiner

*Primary Examiner* — Nathan L Van Sell
(74) *Attorney, Agent, or Firm* — DLA Piper LLP (US)

(57) ABSTRACT

A polypropylene film exhibits a high breakdown voltage even in a high temperature environment and can exhibit a voltage resistance and reliability even in a high temperature environment when used as a capacitor, and a metal layer laminated film and a film capacitor using the polypropylene film. For the polypropylene film, at least one surface of the film has an elastic modulus of 2.6 GPa or more, measured by nanoindentation measurement, and the sum of heat shrinkage rates is in the film longitudinal and width directions 5% or less in a heat treatment at 130° C. for ten minutes.

14 Claims, 1 Drawing Sheet

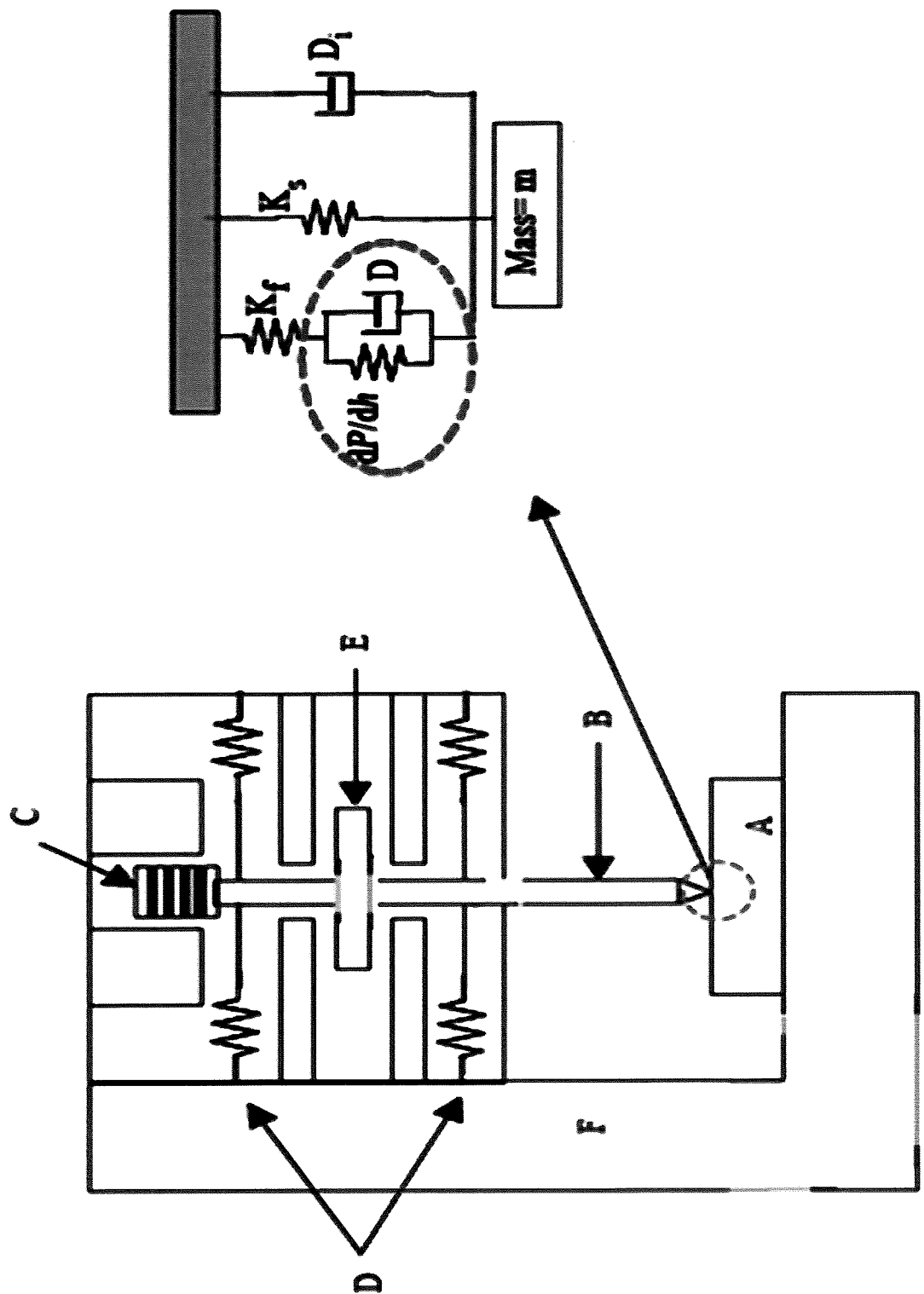

POLYPROPYLENE FILM, METAL LAYER LAMINATED FILM, AND FILM CAPACITOR

TECHNICAL FIELD

This disclosure relates to a polypropylene film, a metal layer laminated film, and a film capacitor.

BACKGROUND

Polypropylene films are excellent in transparency, mechanical properties, electrical properties and the like, and thus used in various applications such as package applications, tape applications, and electrical applications including cable wrapping and capacitors.

Among these applications, the capacitor application is particularly suitably used for not only direct-current applications and alternating-current applications, but also high-voltage capacitors because of the excellent voltage resistance and low-loss characteristics.

Recently, various types of electrical equipment are being converted to inverters and, accordingly, there is an increasing demand for reduction in size and increase in capacitance for capacitors. In response to the demand in such markets, particularly for automotive applications (including hybrid car applications), and solar power generation and wind power generation applications, it has been essential to further reduce film thicknesses while improving the breakdown voltages of polypropylene films, and then maintaining productivity and workability.

It is particularly important for such polypropylene films to have excellent dimensional stability at the usage environment temperatures, while the crystallinity of the films is enhanced at the same time, from the viewpoints of improvement in breakdown voltage, productivity, workability, and heat resistance. From the viewpoint of heat resistance herein, the temperatures of the usage environments are believed to be higher in the future when considering power semiconductor applications that use SiC. Improvements in film breakdown voltage under high-temperature environments in excess of 110° C. have been required due to demands for further heat resistance and voltage resistance as capacitors. However, as described in WO 2009/060944, the upper limit of the temperatures at which polypropylene films are used is known to be about 110° C., and it has been extremely difficult to maintain the breakdown voltage in a stable manner under such temperature environments.

So far, as an approach for achieving thin films for polypropylene films and performance under high-temperature environments, for example, a proposal is made to blend two types of polypropylene resins that differ in melt flow rate (hereinafter referred to as MFR) and control the low molecular weight distribution component, thereby improving the breakdown voltage (for example, WO 2009/060944). In addition, polypropylene films are proposed which have a surface elastic modulus increased by controlling the average isotactic block lengths of polypropylene resins and applying a biaxial drawing (for example, Japanese Patent Laid-open Publication No. 09-001654), and polypropylene films are disclosed which have insulation defects reduced and breakdown voltage variations reduced in high-temperature environments by laminating two or more layers with the use of a polypropylene resin with crystallinity increased, adding particles to the surface and applying biaxial drawing at a high magnification (for example, WO 2016/043217). Furthermore, an approach is proposed in which a polypropylene resin composition containing a polypropylene resin as its main component contains polymethylpentene to form fine unevenness at the surface (for example, Japanese Patent Laid-open Publication No. 2016-191059 and Japanese Patent Laid-open Publication No. 2014-114419). In addition, for release applications, biaxially stretched polypropylene films which are excellent in peeling and smoothness have been also developed by utilizing the fact that polymethylpentene has low surface free energy (for example, Japanese Patent Laid-open Publication No. 2014-030974 and Japanese Patent Laid-open Publication No. 2008-189795). In addition, Japanese Patent Laid-open Publication No. 09-270361 proposes a film for capacitors, which is less likely to cause blocking in the process, and high in adhesion strength in an element after winding, by adding a phenolic antioxidant with a melting point of 140° C. or lower and polymethylpentene and applying a corona treatment.

The polypropylene films described in WO 2009/060944 and Japanese Patent Laid-open Publication No. 09-001654 both have, however, breakdown voltages improved insufficiently under high-temperature environments in excess of 110° C. and, moreover, the voltage resistance and reliability under high-temperature environments in use as a capacitor are considered far from sufficient. As for WO 2016/043217, it has been necessary to further improve the withstanding voltage, although an improvement in breakdown voltage is recognized under high-temperature environment in excess of 110° C. In addition, the polypropylene films described in Japanese Patent Laid-open Publication No. 2016-191059, Japanese Patent Laid-open Publication No. 2014-114419, Japanese Patent Laid-open Publication No. 2014-030974, Japanese Patent Laid-open Publication No. 2008-189795 and Japanese Patent Laid-open Publication No. 09-270361 are each not sufficient for improving the breakdown voltage under an environment at 115° C. and, moreover, the voltage resistance and reliability under high-temperature environments in use as a capacitor are considered far from sufficient.

Accordingly, it could be helpful to provide a polypropylene film that exhibits a higher breakdown voltage even in a high temperature environment and can exhibit a voltage resistance and reliability even in a high temperature environment when used as a capacitor, and a metal layer laminated film and a film capacitor using the polypropylene film.

We thus considered as follows the reason why the breakdown voltages of the polypropylene films described in WO 2009/060944, Japanese Patent Laid-open Publication No. 09-001654 and WO 2016/043217 under high-temperature environments, as well as the voltage resistance and reliability in use as capacitors are not sufficient.

More specifically, as for the polypropylene films in WO 2009/060944, Japanese Patent Laid-open Publication No. 09-001654, Japanese Patent Laid-open Publication No. 2016-191059, Japanese Patent Laid-open Publication No. 2014-114419 and Japanese Patent Laid-open Publication No. 09-270361, we considered that the reason is insufficient crystallinity and, thus, low surface elastic modulus, due to the low draw ratios associated with the use of polypropylene resins with low stereoregularity and the inappropriate heat treatments for stabilizing the structure after the drawing. As for the polypropylene film described in WO 2016/043217, we considered that the reason is the insufficiently stabilized molecular chain orientation structure and, thus, the insufficiently low heat shrinkage rate, due to the fact that there is room for further improvement in the degree of crystallinity with a lot of cold xylene soluble component (hereinafter CXS), although the polypropylene resin with high stereoregularity is used, and the fact that the preheating temperature before lateral drawing is low, without any slow cooling treatment performed because of the heat treatment temperature after the lateral drawing. Furthermore, as for the polypropylene films described in Japanese Patent Laid-open Publication No. 2014-030974, Japanese Patent Laid-open Publication No. 2008-189795 and Japanese Patent Laid-open Publication No. 09-270361, we considered that the reason is that the surface elastic modulus is decreased because of the high content of polymethylpentene and, moreover, the generation of voids during the drawing decreases the dielectric breakdown strength of the film.

We further found that the surface elastic modulus of the polypropylene film is equal to or more than a certain value and that the sum of the heat shrinkage rates in the width direction and the longitudinal direction is equal to or less than a certain value after the heat treatment under predetermined conditions.

SUMMARY

We thus provide a polypropylene film where at least one surface of the film has an elastic modulus of 2.6 GPa or more, measured by nanoindentation measurement and the sum of heat shrinkage rates in the film longitudinal and width directions is 5% or less in a heat treatment at 130° C. for ten minutes.

We provide a polypropylene film that exhibits a high breakdown voltage even in a high temperature environment and can exhibit a voltage resistance and reliability even in a high temperature environment when used as a capacitor and a metal layer laminated film and a film capacitor using the polypropylene film.

BRIEF DESCRIPTION OF THE DRAWING

The FIGURE is a conceptual diagram showing the measurement principle for the elastic modulus (nano indentation measurement) of a film surface.

DESCRIPTION OF REFERENCE SIGNS

A: Sample (film)
B: Indenter shaft (mass m)
C: Coil that generates a load
D: Leaf spring fishing the indenter system (stiffness Ks)
E: Capacitive displacement detector (loss constant Di)
F: Road frame (stiffness Kf=1/Cf)

DETAILED DESCRIPTION

For our polypropylene film, at least one surface thereof has an elastic modulus of 2.6 GPa or more, measured by nanoindentation measurement, and the sum of heat shrinkage rates in the film longitudinal and width directions is 5% or less in a heat treatment at 130° C. for ten minutes. The polypropylene film may be referred to as a film. Moreover, the polypropylene film is not a microporous film and, thus, does not have a large number of pores.

The polypropylene film exhibits a high breakdown voltage even under high-temperature environments, and to develop as a capacitor, voltage resistance and reliability even under high-temperature environments, at least one surface of the film has an elastic modulus of 2.6 GPa or more, measured by nanoindentation measurement. The elastic modulus is preferably 2.7 GPa or more, more preferably 2.8 GPa or more. The upper limit is not particularly limited, but is preferably 4.0 GPa in practice. When the elastic modulus is less than 2.6 GPa, the density of the crystal structure constituting the film is believed to be insufficient, there will be sites likely to undergo partial breakdown, and the voltage resistance under high-temperature environments is insufficient. In use as a capacitor, a decrease in capacitance or short circuit breakdown may be caused in high-temperature environments, thereby leading to a decrease in voltage resistance, and impairing reliability. On the other hand, when an attempt is made to produce a film in excess of 4.0 Gpa, it is necessary to increase a draw ratio, thereby making film breakdown likely to be caused in the film formation, which is not preferable from the viewpoint of productivity.

Furthermore, for the polypropylene film, the sum of the heat shrinkage rates in the film longitudinal direction and width directions is 5% or less in a heat treatment at 130° C. for ten minutes. The sum of the heat shrinkage rates is preferably 4.5% or less, more preferably 4.0% or less, even more preferably 3.5% or less. The lower limit is not particularly limited, but is preferably 1%, because the winding of the element may be loosened due to heat in the capacitor manufacturing process or use process. If the sum of the heat shrinkage rates exceeds 5%, the film itself may shrink due to the heat in the capacitor manufacturing process and use process, thereby decreasing the voltage resistance due to poor contact with element end metallicon, or causing a decrease in capacitance or short circuit breakage due to the element wound and tightened.

Furthermore, the heat shrinkage rate of the polypropylene film in the heat treatment at 130° C. for ten minutes in the width direction is preferably 1% or less, more preferably 0.8% or less, even more preferably 0.6% or less, most preferably 0.4%. The lower limit is not particularly limited, but is −2%, because the winding of the element may be loosened due to heat in the capacitor manufacturing process or use process.

In this regard, the "longitudinal direction" in the polypropylene refers to a direction corresponding to the flow direction in the film production process (hereinafter, sometimes referred to as "MD"), and the "width direction" refers to a direction orthogonal to the flow direction in the film production process (hereinafter sometimes referred to as "TD").

To increase the surface elastic modulus of the polypropylene film, it is possible to increase the area magnification in a drawing step at the time of film formation, but on the other hand, the influence of the strain caused by drawing increases the heat shrinkage rate. Thus, for the polypropylene film to control the surface elastic modulus and heat shrinkage rate of the film respectively within the ranges mentioned above, there are, for example, the control of, within preferred ranges, the conditions such as the use of a polypropylene raw material which is high in mesopentad fraction as described later, high in 2ndRUN melting peak temperature ($T_{m2}$), and low in CXS amount, and the cooling temperature for solidification by cooling the molten sheet; the adjustment of the preheating temperature immediately before biaxial drawing in the width direction after uniaxial drawing in the longitudinal direction to the drawing temperature in the width direction +5 to +15° C., with the area magnification of 50 times or more for biaxial drawing; and a method of, in the heat treatment and relaxation treatment steps after the biaxial drawing, appropriately applying, to the film, the multi-stage heat fixation treatment and relaxation treatment of first performing a relaxation treatment while performing a heat treatment at a temperature that is lower than the drawing temperature in the width direction (first stage), then performing a heat treatment at a temperature of 130° C. or higher, which is lower than the first-stage heat treatment temperature (second stage), with the film kept to have tension in the width direction, and further performing a heat treatment (third stage) under the condition of 80° C. or higher and lower than the second-stage heat treatment temperature.

The film which has a surface elastic modulus increased by achieving high crystallization preferably has a melting peak temperature ($T_{m2}$) of 164° C. or higher, in increasing the temperature of the film from 30° C. to 260° C. at 20° C./min, then decreasing the temperature from 260° C. to 30° C. at 20° C./min, and further increasing the temperature again from 30° C. to 260° C. at 20° C./min with a differential scanning calorimeter (DSC). More preferably, the melting peak temperature is 165° C. or higher, even more preferably, 166° C. or higher. The upper limit is not particularly limited, but is preferably 175° C. If $T_{m2}$ is less than 164° C., the stability of the crystal structure is believed to be insufficient, the film is likely to undergo partial breakdown, thereby making the breakdown voltage of the film more likely to be decreased. In use as a capacitor, a decrease in capacitance or short circuit breakdown may be caused under high-temperature environments.

In this regard, the melting peak temperature ($T_{m2}$) obtained in increasing the temperature of the film with a differential scanning calorimeter (DSC) to melt the film, then decreasing the temperature, and then increasing the temperature again is typically referred to as a "2ndRUN melting peak temperature". Furthermore, the melting peak temperature ($T_{m1}$) obtained in first increasing the temperature of the film with a differential scanning calorimeter (DSC) is referred to as "1stRUN melting peak temperature".

In the 2ndRUN temperature rising curve from the DSC, the melting peak for a small amount of additive included in the polypropylene film may be also observed, but in our films, the peak observed at 164° C. or higher and 200° C. or lower is regarded as the DSC melting peak temperature of the polypropylene film. In this example, when two or more melting peak temperatures are observed within the temperature range, or a peak temperature that can be observed on a multi-stage DSC chart referred to as a shoulder (observed in a chart with two or more peaks overlapped with each other), but in our film, the temperature of a peak with the largest absolute value of vertical axis heat flow (unit; mW) on a DSC chart is referred to as the DSC melting peak temperature ($T_{m2}$) of the polypropylene film.

Furthermore, in increasing the temperature of the polypropylene film from 30° C. to 260° C. at 20° C./min, then decreasing the temperature from 260° C. to 30° C. at 20° C./min, and further increasing the temperature again from 30° C. to 260° C. at 20° C./min, the total heat quantity of melting is from 100° C. to 180° C. of the DSC curve at the time of increasing the temperature again is preferably 105 J/g or more, more preferably 108 J/g or more, even more preferably 110 J/g or more. The upper limit is not particularly limited, but is 130 J/g. When the heat of melting is less than 105 J/g, the film includes crystals and an amorphous component, and the surface elastic modulus of the film is not sufficient. For this reason, in decreasing the breakdown voltage of the film or using the film as a capacitor, a decrease in capacitance or short circuit breakdown may be caused under high-temperature environments. In this regard, the total heat quantity of melting is represented by the total heat quantity of melting for the entire film including the additive. This is because the amount of the additive is small, thus, less affecting the heat of melting derived from the high crystallinity of the polypropylene.

The polypropylene film preferably has a mesopentad fraction of 0.970 or more. The mesopentad fraction is more preferably 0.975 or more, even more preferably 0.980 or more.

The mesopentad fraction is an index indicating the stereoregularity of the crystalline phase of polypropylene, measured by a nuclear magnetic resonance (NMR) method, and as the numerical value is larger, the degree of crystallinity is increased, thereby increasing the 2ndRUN melting peak temperature ($T_{m2}$), which has an effect of increasing the surface elastic modulus. Thus, the breakdown voltage under high-temperature environments can be improved, which is preferable. The upper limit of the mesopentad fraction is not to be considered particularly specified. The polypropylene resin with a high mesopentad fraction is preferably, in particular, a resin obtained with a so-called Ziegler-Natta catalyst, and a method such as appropriately selecting an electron-donating component is preferably adopted. Thus, the polypropylene resin can be adapted to have a molecular weight distribution (Mw/Mn) of 3.0 or more, and a <2,1> erythro site defect of 0.1 mol % or less. It is preferable to use such a polypropylene resin. If the polypropylene resin has a mesopentad fraction of less than 0.970, the regularity of the polypropylene is low, thus, in some examples, a decrease in the strength or breakdown voltage of the film under high-temperature environments may be caused, or film breakdown may be caused in a step of forming a metal film by vapor deposition or during film transport in winding a capacitor element.

When the polypropylene film is completely dissolved in xylene and then deposited at room temperature, the polypropylene component dissolved in xylene (cold xylene soluble component (hereinafter CXS)) is less than 1.5% by mass with respect to the total mass of the film. In this regard, the cold xylene soluble component (hereinafter CXS) is considered corresponding to a component which is unlikely to be crystallized because of the low stereoregularity, the low molecular weight or the like. When the CXS exceeds 1.5% by mass, problems may be caused, such as a decrease in the breakdown voltage of the film, a decrease in the thermal dimensional stability thereof, or an increase in leakage current. Thus, the CXS is more preferably 1.3% by mass or less, and still more preferably 1.1% by mass or less. To obtain such a CXS content, there are methods such as a method of increasing the catalytic activity for obtaining the polypropylene resin to be used, and a method of washing the obtained polypropylene resin with a solvent or the propylene monomer itself.

The polypropylene used for the polypropylene film preferably has a melt flow rate (MFR) of 1 to 10 g/10 min (230° C., 21.18 N load), more preferably 2 to 5 g/10 min (230° C., 21.18 N load), from the viewpoint of the film formation property. To adjust the melt flow rate (MFR) to have the value mentioned above, there is a method of controlling the average molecular weight or the molecular weight distribution.

The polypropylene used for the polypropylene film is mainly composed of a homopolymer of propylene, but may contain a copolymerization component obtained from another unsaturated hydrocarbon and the like without impairing the desired effect, or may be blended with a propylene polymer other than homopolymers. Examples of monomer components constituting such a copolymerization component or blended product include ethylene, propylene (in the example of copolymerized blended products), 1-butene, 1-pentene, 3-methylpentene-1, 3-methylbutene-1, 1-hexene, 4-methylpentene-1, 5-ethylhexene-1, 1-octene, 1-decene, 1-dodecene, vinylcyclohexene, styrene, allylbenzene, cyclopentene, norbornene, and 5-methyl-2-norbornene. From the viewpoint of breakdown voltage and heat resistance, the copolymerized amount or blended amount is preferably less than 1 mol % in terms of copolymerized amount, and preferably less than 10% by mass in terms of blended amount.

The polypropylene film is preferably a polypropylene resin in which the content of organic particles or inorganic particles is less than 0.01% by weight.

The polypropylene resin used in the polypropylene film may contain various additives, for example, crystal nucleating agents, antioxidants, thermal stabilizers, chlorine scavengers, slipping agents, antistatic agents, antiblocking agents, fillers, viscosity modifiers, and color protection agents without impairing the desired effect.

When the polypropylene resin contains an antioxidant among the foregoing additives, the selection of the type and amount of the antioxidant is important from the viewpoint of long-term heat resistance. More specifically, as such an antioxidant, a phenolic-type antioxidants with steric hindrance are preferred, at least one of which is a high molecular weight type antioxidant that has a molecular weight of 500 or more. Specific examples thereof include various examples, and for example, it is preferable to use 2,6-di-t-butyl-p-cresol (BHT: molecular weight 220.4) in combination with 1,3,5-trimethyl-2,4,6-tris(3,5-di-t-butyl-4-hydroxybenzyl)benzene (for example, "Irganox" (registered trademark) 1330: molecular weight 775.2, manufactured by BASF) or tetrakis[methylene-3(3,5-di-t-butyl-4-hydroxyphenyl) propionate]methane (for example, "Irganox" (registered trademark) 1010: molecular weight 1177.7, manufactured by BASF). The total content of these antioxidants preferably is 0.1 to 1.0% by mass with respect to the total amount of polypropylene. The excessively small amount of the antioxidant may result in inferior long-term heat resistance. The excessively large amount of the antioxidant may adversely affect the capacitor element, due to blocking under a high temperature by the antioxidants bleeding out. More preferably, the total content is 0.2 to 0.7% by mass, particularly preferably, 0.2 to 0.4% by mass.

For the polypropylene film, the three-dimensional center plane average roughness SRa of at least one surface is preferably 10 to 50 nm, more preferably 12 to 45 nm, still more preferably 15 to 40 nm, from the viewpoint of achieving workability during capacitor element creation and reliability as a capacitor while moderately smoothing the surface to improve the withstanding voltage. If the SRa of at least one surface is less than 10 nm, the slippage of the film may be extremely decreased, thereby resulting in inferior handling ability, wrinkles may be more likely to be generated, thereby resulting in inferior element processability, the change in capacitance may be increased by the influence of wrinkles and the like in continuous use as a capacitor, or in a capacitor with the film laminated, the self-healing function (self-healing) may be unlikely to be fulfilled because there is no moderate gap between film layers, thereby decreasing the reliability of the capacitor. On the other hand, if the SRa of at least one surface exceeds 50 nm, the reduction in withstanding voltage may be affected.

In addition, for the polypropylene film, from the viewpoint of roughening a surface moderately to achieve gap uniformity between film layers, ease of slippage between films or between the film and a convey roll, workability during capacitor element creation, and reliability as a capacitor, the ten-point average roughness SRz of at least one surface is 50 to 500 nm, more preferably 100 to 480 nm, and still more preferably 150 to 450 nm. If the SRz of at least one surface is less than 50 nm, the slippage of the film may be extremely decreased, resulting in inferior handling ability, or wrinkles may be more likely to be generated, thereby resulting in inferior element processability. In addition, the change in capacitance may be increased by the influence of wrinkles and the like in continuous use as a capacitor, or in a capacitor with the film laminated, the self-healing function (self-healing) may be unlikely to be fulfilled because there is no moderate gap between film layers, thereby decreasing the reliability of the capacitor. On the other hand, if the SRz of at least one surface exceeds 500 nm, the surface affects as a bulky protrusion, thereby making it difficult to achieve a reduction in withstanding voltage and thickness uniformity, and the change in capacitance may be increased by the influence of wrinkles and the like in continuous use as a capacitor. In this regard, to control the SRa and SRz of the polypropylene film within the above-mentioned preferred range, it is possible to make an achievement by, for example, the use of a polypropylene raw material with the high mesopentad fraction described later and a high 2ndRUN melting peak temperature $T_{m2}$, or the control of conditions such as the cooling temperature in solidification by cooling a molten sheet or the preheating temperature before drawing in the width direction within a preferred range.

The polypropylene film preferably contains a thermoplastic resin that is incompatible with polypropylene, at 0.1% by mass or more and 4% by mass or less. The proportion of the incompatible thermoplastic resin contained in the film is more preferably 0.5 to 3.5% by mass, and still more preferably 1 to 3% by mass. If the content of the thermoplastic resin is less than 0.1% by mass, the film surface may have no unevenness formed efficiently, thus, resulting in poor slippage and inferior capacitor element processing. On the other hand, if the content of the thermoplastic resin exceeds 4% by mass, the interfacial adhesion between the resins may be inferior due to the low compatibility with polypropylene, thereby generating voids during drawing, and then decreasing the dielectric breakdown strength of the film, or decreasing the withstanding voltage in use as a capacitor.

Further, when the polypropylene film is a laminated film will be described. The multiple layers in the laminated film are preferably laminated layers each containing polypropylene as a main constituent. The multiple layers may be composed of two layers, or may be composed of three or more layers and, in the example of two layers, one of the layers is referred to as an A layer, and the other thereof is referred to as a B layer, the A layer and the B layer have surfaces exposed on the side opposite to the bonded surfaces. Such a laminated film is denoted as A/B. In the example of three layers, the surface layers are referred to as A layers, and the inner layer is a B layer. Such a laminated film is denoted as A/B/A. Furthermore, when the number of layers is four or more, B layers refers to two or more layers as inner layers, and A layers refer to layers formed at the outermost surfaces. Such a laminated film is denoted as A/B/B/A. In this regard, at least one of the surface layer (A layers) of the film preferably has a thermoplastic resin that is incompatible with polypropylene at 0.1% by mass or more and 4% by mass or less with respect to the polypropylene resin. This means that the surface roughness of the film depends on the surface layer (A layer), and the layer made of polypropylene in the inner layer (B layer) may be not to affect the high crystallinity, an inner layer (B layer) that does not contain the incompatible thermoplastic resin, or an inner layer (B layer) in which the incompatible thermoplastic resin is 0.1% by mass or more and 4% by mass or less as in the surface layer. From the viewpoint of efficiently forming unevenness at the surface, the content of the incompatible thermoplastic resin in the surface layer (A layer) is preferably higher than that in the inner layer (B layer). The content of the thermoplastic resin that is incompatible with polypropylene in the surface layer (A layer) is more preferably 0.5 to 3.5% by mass, and still more preferably 1 to 3% by mass.

Examples of a method of creating the laminated film include a method of attaching films to each other by lamination, feed-block multi-manifold methods by co-extrusion, and a method by coating. Among these lamination methods, a lamination method by melt co-extrusion and a lamination method by coating are preferred from the viewpoint of production efficiency and cost. Furthermore, the lamination is preferably a structure composed of two or more layers, more preferably three or more layers laminated in the film thickness direction.

In general, methods known as methods of roughening the surface of a polypropylene film include a method of forming β-spherocrystals by increasing the temperature for solidification on a casting (cooling) drum after melt extrusion to a high temperature of 60° C. or higher in a film production step, and making crystal transformation of the thermally unstable β-crystals into α-crystals in a drawing step. Voids formed in the process of the crystal transformation may, however, act as insulation defects, thereby decreasing the withstanding voltage. The polypropylene film has an A layer composed of a resin obtained by blending polypropylene and a thermoplastic resin that is incompatible with polypropylene, and in the film production step, it is preferable to form fine α-spherocrystals or a mesophase preferentially by adjusting the temperature for solidification on the cooling drum after melt extrusion to lower than 60° C., preferably lower than 40° C., more preferably lower than 30° C. For this reason, the polypropylene film has no void formed by crystal transformation in the drawing step, generates substantially no insulation defects, has excellent suitability for capacitor element processing even in thin a film, and has the ability to produce high voltage resistance even in high-temperature environments. In this regard, the mesophase indicates an intermediate ordered state between crystal and amorphous, which is also referred to as a smectic crystal, and the mesophase is known to be produced in solidification at a very high cooling rate from the molten state. Since the mesophase is an intermediate phase, the memophase forms a uniform structure in the drawing step and, thus, serves as a structure preferred for reduction of insulation defects. In addition, the constituent layer composed of the resin obtained by blending polypropylene and the thermoplastic resin that is incompatible with polypropylene can be provided with surface unevenness through the use of the domain structure, thus, without generating insulation defects, such as void formation associated with crystal transformation in the drawing step, has excellent suitability for capacitor element processing even in a thin film, and has the ability to produce high voltage resistance even in high-temperature environments. As the thermoplastic resin that is incompatible with polypropylene, for example, a polymethylpentene-based resin can be used in a preferred manner. In this regard, in the constituent layer composed of the resin obtained by blending polypropylene and the thermoplastic resin that is incompatible with polypropylene, the polypropylene resin forms a mesophase structure and then undergoes drawing, thereby making it possible to suppress peeling at the resin interface between the stretched polypropylene and a thermoplastic resin that is incompatible with the polypropylene, and the resin, thus, has no void formed, generates substantially no insulation defects, has surface unevenness which is excellent in suitability for capacitor element processing even in a thin film, and has the ability to produce high voltage resistance even in high-temperature environments.

In this regard, when the polypropylene film is composed of two or more layers laminated in the thickness direction, the proportion of the A layer thickness to the total thickness of the film (the combined thickness proportion of A layers where both surfaces serve as the A layers) is preferably 1% to 60%, more preferably 5 to 40%, most preferably 5 to 25% from the viewpoint of controlling the film formation performance and the surface shape. If the proportion of the A layer is excessively high, the voltage resistance in a high-temperature environment may be decreased due to voids. On the other hand, if the proportion of the A layer is excessively low, unevenness may be formed inefficiently at the film surface, thereby failing to achieve suitability for capacitor element processing. In this regard, the A layer can be identified, for example, by creating a film cross section and observing the cross section with the use of a scanning electron microscope (SEM) or the like. The cross-sectional observation is capable of determining an A layer of a constituent layer composed of a resin containing particles or a resin obtained by blending polypropylene and a thermoplastic resin that is incompatible with the polypropylene, or the resin interface between an A layer and a B layer.

The polypropylene film preferably has, for at least one surface (A layer) thereof, a resin composition obtained by blending polypropylene and a thermoplastic resin that is incompatible with the polypropylene. The surface (A layer) can be provided with surface unevenness through the use of a sea-island structure formed by the blended resin composition. As the thermoplastic resin that is incompatible with polypropylene, a polymethylpentene-based resin is particularly preferred, because the resin is incompatible with polypropylene, but is relatively high in affinity, and can be reduced in domain size. In addition, the melting point of the polymethylpentene-based resin is preferably 205 to 240° C., more preferably, 220 to 240° C., from the viewpoint of providing surface unevenness through the use of the extrusion stability in blending with polypropylene while the resin is incompatible with polypropylene, and the domain sea-island structure. For the polymer of 4-methylpentene-1, "TPX" (registered trademark) MX series, "TPX" (registered trademark) DX series and the like manufactured by Mitsui Chemicals, Inc. can be preferably used.

In addition, for the polypropylene film, the arithmetic mean height Sa of at least one surface is preferably 5 to 20 nm, more preferably 7 to 18 nm, and still more preferably 9 to 15 nm from the viewpoint of roughening a surface moderately to achieve gap uniformity between film layers, ease of slippage between films or between the film and a convey roll, workability during capacitor element creation, and reliability as a capacitor. If the Sa of at least one surface is less than 5 nm, the slippage of the film may be extremely decreased, resulting in poor handling ability, and resulting in inferior element processability such as wrinkle generation. In addition, the change in capacitance may be increased by the influence of wrinkles and the like in continuous use as a capacitor, or in a capacitor with the film laminated, the self-healing function (self-healing) may be unlikely to be fulfilled because there is no moderate gap between film layers, thereby decreasing the reliability of the capacitor. On the other hand, if the Sa of at least one surface exceeds 20 nm, the reduction in withstanding voltage may be affected.

In addition, for the polypropylene film, from the viewpoint of roughening a surface moderately to achieve gap uniformity between film layers, ease of slippage between films or between the film and a convey roll, workability during capacitor element creation, and reliability as a capacitor, the maximum height Sz of at least one surface is 100 to 500 nm, more preferably 100 to 350 nm, still more preferably 100 to 200 nm. If the Sz of at least one surface is less than 100 nm, the slippage of the film may be extremely decreased, resulting in poor handling ability, and resulting in inferior element processability such as wrinkle generation. In addition, the change in capacitance may be increased by the influence of wrinkles and the like in continuous use as a capacitor, or in a multilayer film capacitor, the self-healing function (self-healing) may be unlikely to be fulfilled because there is no moderate gap between film layers, thereby decreasing the reliability of the capacitor. On the other hand, if the Sz of at least one surface exceeds 500 nm, the surface affects as a bulky protrusion, thereby making it difficult to achieve a reduction in withstanding voltage and thickness uniformity, and the change in capacitance may be increased by the influence of wrinkles and the like in continuous use as a capacitor.

In this regard, to control the Sa and Sz of the film within the above-mentioned preferred range, it is possible to make an achievement by, for example, the control of conditions such as the cooling temperature in solidification by cooling a molten sheet to be described later or the preheating temperature before drawing in the width direction within a preferred range, or the control of the blend ratio within a preferred range for the surface composition of a film including a resin obtained by blending polypropylene and a thermoplastic resin that is incompatible with polypropylene.

The polypropylene film preferably has a 1stRUN melting peak temperature ($T_{m1}$) of 174° C. or higher in a temperature increase from 30° C. to 260° C. at 20° C./min by DSC. More preferably, the 1 stRUN melting peak temperature is 176° C. or higher, still more preferably, 178° C. or higher. The upper limit of the peak temperature is 200° C. Higher $T_{m1}$ means that the degree of crystallinity of the film is higher, which is preferred from the viewpoint of improving the breakdown voltage under high-temperature environments. In this regard, when the polypropylene film is a film including polypropylene and a thermoplastic resin that is incompatible with polypropylene, the melting peak temperature of the incompatible resin is observed as a temperature that is different from the peak temperature of polypropylene, but in our film, the peak observed at 174° C. or higher and 200° C. or lower is referred to as the 1 stRUN melting peak temperature ($T_{m1}$) of the polypropylene film. In this regard, there is an example where two or more 1 stRUN melting peak temperatures are observed within the temperature range, or a peak temperature that can be observed on a multi-stage DSC chart referred to as a shoulder (observed in a chart with two or more peaks overlapped with each other), but in our film, the temperature of a peak with the largest absolute value of vertical axis heat flow (unit; mW) on a DSC chart is referred to as $T_{m1}$. In this regard, the DSC 1 stRUN melting peak temperature ($T_{m1}$) of the polypropylene film is higher than the 2ndRUN melting peak temperature ($T_{m2}$). The reason why ($T_{m1}$) is higher is that the melting peak temperature is increased due to the molecular chain orientation and the increased crystal size under the influence of drawing and heat treatment steps in the production of the polypropylene film.

The polypropylene film preferably has a coefficient of static friction (μs) of 0.3 or more and 1.5 or less in films laminated on one another, from the viewpoint of having element processability while improving the withstanding voltage characteristics under high-temperature environments. If the μs is less than 0.3, the film may slip excessively, thereby causing winding deviations in winding or element processing during film formation. If the exceeds 1.5, the slippage of the film may be extremely decreased, resulting in inferior handling ability, or making wrinkles more likely to be generated, or resulting in inferior element processability. The μs is more preferably 0.4 or more and 1.3 or less, still more preferably 0.5 or more and 1.1 or less.

The glossiness of at least one surface is preferably 130% or more and less than 150%, more preferably 132% or more and less than 148%, still more preferably 135% or more and less than 146%. If the glossiness is less than 130%, the high light scattering density at the film surface means that the surface is excessively roughened, and the breakdown voltage of the film may be decreased. On the other hand, if the glossiness is 150% or more, the glossiness means that the surface is smoothed, and the slippage of the film may be extremely decreased. Thus, the handling ability may be worsened, wrinkles may be more likely to be generated, resulting in inferior element processability.

The difference between the stress at 80% elongation (F80 value) and the stress at 30% elongation (F30 value) in the longitudinal direction in a tensile test is preferably 50 MPa or more. If the difference between the F80 value and the F30 value is less than 50 MPa, the difference means that the polypropylene molecular chain is insufficient in orientation and tension, and the surface elastic modulus will be decreased, or the breakdown voltage of the film is likely to be decreased under high-temperature environments. In using the film as a capacitor, a decrease in capacitance or short circuit breakdown may be caused under high-temperature environments, thereby leading to a decrease in voltage resistance, and then impairing the reliability. The difference between the F80 value and the F30 value is more preferably 55 MPa or more, and even more preferably 60 MPa or more. The upper limit of the difference between the F80 value and the F30 value is not particularly limited, but is 100 MPa from the viewpoint of film formation property, because high-ratio drawing is required to increase the difference. For the control of the difference between the stress at 80% elongation (F80 value) and the stress at 30% elongation (F30 value) in the longitudinal direction of the polypropylene film within the above-mentioned preferred range, it is possible to achieve the difference by, for example, the control of, within preferred ranges, the conditions such as the use of a polypropylene raw material which is high in mesopentad fraction as described later, low in CXS amount, and high in 2ndRUN melting peak temperature ($T_{m2}$), and the cooling temperature for solidification by cooling the molten sheet; the adjustment of the preheating temperature immediately before biaxial drawing in the width direction after uniaxial drawing in the longitudinal direction to the drawing temperature in the width direction +5 to +15° C., with the area magnification of 50 times or more for biaxial drawing; and a method of, in the heat treatment and relaxation treatment steps after the biaxial drawing, appropriately applying, to the film, the multi-stage heat fixation treatment and relaxation treatment of first performing a relaxation treatment while performing a heat treatment at a temperature that is lower than the drawing temperature in the width direction (first stage), then performing a heat treatment at a temperature of 130° C. or higher, which is lower than the first-stage heat treatment temperature (second stage), with the film kept to have tension in the width direction, and further performing a heat treatment (third stage) under the condition of 80° C. or higher and lower than the second-stage heat treatment temperature.

According to an example described above, the polypropylene film has a film breakdown voltage of 400 V/μm or more at 130° C. In one example of the method of effectively achieving a high breakdown voltage even under high-temperature environments, it is preferable to, for example, control, within preferred ranges, the conditions such as the use of a polypropylene raw material which is high in mesopentad fraction as described later, low in CXS amount, and high in 2ndRUN melting peak temperature ($T_{m2}$), and the cooling temperature for solidification by cooling the molten sheet; adjust the preheating temperature immediately before biaxial drawing in the width direction after uniaxial drawing in the longitudinal direction to the drawing temperature in the width direction +5 to +15° C., with the area magnification of 50 times or more for biaxial drawing; and in the heat treatment and relaxation treatment steps after the biaxial drawing, appropriately apply, to the film, the multi-stage heat fixation treatment and relaxation treatment of first performing a relaxation treatment while performing a heat treatment at a temperature that is lower than the drawing temperature in the width direction (first stage), then performing a heat treatment at a temperature of 130° C. or higher, which is lower than the first-stage heat treatment temperature (second stage), with the film kept to have tension in the width direction, and further performing a heat treatment (third stage) under the condition of 80° C. or higher and lower than the second-stage heat treatment temperature.

The polypropylene film preferably has a film thickness of 0.5 μm or more and less than 10 μm, from the viewpoint of being suitable for heat-resistant film capacitors of thin films required for automotive applications (including hybrid car applications) particularly for use in high-temperature environments. More preferably, the film thickness is 0.6 μm or more and 8 μm or less, even more preferably 0.8 μm or more and 6 μm or less, and for heat-resistant film capacitor applications, most preferably 0.8 μm or more and 4 μm or less for the balance between the characteristics and the capacitor size reduced in film thickness.

The polypropylene film is preferably obtained by drawing an unstretched polypropylene film having a mesophase structure twice or more at least in one direction, from the viewpoint of improving the film withstanding voltage. Drawing twice or more in one direction can stretch the molecular chain to provide an oriented structure, thereby improving the mechanical properties of the film, and allowing the voltage resistance and reliability under high-temperature environments to be improved in using the film as a capacitor. From this viewpoint, the drawing is preferably performed 4.6 times or more, more preferably 5.0 times or more, and still more preferably 5.6 times or more in at least one direction. The upper limit is not particularly limited, but drawing 15 times or more is preferred from the viewpoint of film formation stability. The mesophase structure is desirably formed at the stage of the unstretched polypropylene film. In this regard, the mesophase is an intermediate phase between a crystal and an amorphous phase, and is specifically produced in solidification at a very high cooling rate from a molten state. Generally, it is known that spherocrystals grow when polypropylene is crystallized, but when a crystallized unstretched polypropylene film is drawn, a difference in drawing stress is produced between the spherocrystal part and the amorphous part between the spherocrystals, thereby generating local unevenness of stretching and then making a decrease in withstanding voltage more likely to be caused. On the other hand, the mesophase produces no spherocrystals, thus, generating no unevenness of stretching, and allowing an excellent withstanding voltage to be generated. To form a mesophase efficiently with the use of an unstretched polypropylene film, it is necessary to inhibit crystal growth, but polypropylene is very likely to undergo crystal growth in a cooling step after melting the polypropylene. In particular, the use of homopolypropylene with high stereoregularity makes crystal growth very likely to proceed, thus, interfering with the formation of a mesophase. Thus, typically, to inhibit crystal growth, an approach is used, such as the use of a polypropylene with a low mesopentad fraction or the use of a copolymer such as a propylene-ethylene copolymer. The use of such a means may, however, deteriorate the mechanical properties of the film under high-temperature environments or increase the heat shrinkage rate thereof. Examples of an approach for forming a mesophase while inhibiting crystal growth include inhibition of crystal growth by adjusting the temperature of a casting drum to 10 to 3040° C. or lower, adjusting the unstretched polypropylene film to 300 μm or lower, increasing the cooling efficiency with cold air blown to the unstretched polypropylene film on the casting drum, setting the temperature of a base lip part to be higher than that of the upstream short pipe part. The effect of increasing the temperature of the base lip part is assumed to be due to the reduced friction between the polymer and the lip part and the ability to inhibit crystallization by shearing.

The polypropylene film is preferably used as dielectric films for capacitors, but the types of the capacitors are not to be considered limited. Specifically, from the viewpoint of electrode composition, the capacitors may be a combined wound capacitor of metal foil and film, or a metal vapor deposited film capacitor, and are also preferably used for oil immersion-type capacitors impregnated with insulating oil or dry-type capacitors in which no oil is used at all. Because of the characteristics of the film, however, the capacitors are preferably used as particularly metal vapor deposited film capacitors. From the viewpoint of shape, the capacitors may be wound-type or laminated-type capacitors.

Since a polypropylene film typically has low surface energy and, thus, has difficulty in performing stable metal vapor deposition, the film is preferably subjected to a surface treatment before vapor deposition for the purpose of providing favorable metal adhesion. Specifically, examples of the surface treatment include a corona discharge treatment, a plasma treatment, a glow treatment, and a flame treatment. Typically, the surface wetting tension of a polypropylene film is approximately 30 mN/m, but it is preferable for the foregoing surface treatments to adjust the wetting tension to 37 to 75 mN/m, preferably 39 to 65 mN/m, most preferably about 41 to 55 mN/m, because the film is excellent in adhesion to metal films, and also has favorable safety.

The polypropylene is obtained by biaxial drawing, heat treatment and relaxation treatment with the use of raw materials that can provide the above-described properties. The polypropylene film can be obtained by any of inflation simultaneous biaxial drawing methods, tenter simultaneous biaxial drawing methods, and tenter sequential biaxial drawing methods as the biaxial drawing method, and it is preferable to employ, among the methods, the tenter sequential biaxial drawing methods in terms of controlling the formation stability, crystalline/amorphous structure, surface properties, mechanical properties, and thermal dimensional stability of the film.

Next, a method of producing the polypropylene film will be described.

First, a polypropylene resin is subjected to melt extrusion onto a support to provide an unstretched polypropylene film. This unstretched polypropylene film is drawn in the longitudinal direction, and then drawn in the width direction to achieve sequential biaxial drawing. Thereafter, the film is subjected to heat treatment and relaxation treatment to produce a biaxially oriented polypropylene film. Hereinafter, the method will be described more specifically, but is not to be considered necessarily limited thereto.

First, from the viewpoint of improving the breakdown voltage and thermal dimensional stability of the film, and reducing leakage current, a polypropylene resin with less than 1.5% by mass of CXS is subjected to melt extrusion from a single screw extruder, passed through a filtration filter, and then extruded from a slit-shaped base at a temperature of 230 to 280° C., more preferably 230 to 260° C. The molten sheet extruded from the slit-shaped base is solidified on a casting drum (cooling drum) controlled to a temperature of 10 to 110° C. to obtain an unstretched polypropylene film. In a laminated structure, a raw material A obtained by compounding a resin that is incompatible with a polypropylene resin into the polypropylene resin is supplied to a single screw extruder for surface layers (A layers) in advance, and a polypropylene resin raw material B is supplied to a single screw extruder for inner layers (B layers), and a resin laminated in accordance with a three-layer configuration of A layer/B layer/A layer is extruded as a molten sheet from a slit-shaped base through a feed block method by melt co-extrusion at 200 to 280° C., more preferably 200 to 260° C., and solidified on a cooling drum controlled at a temperature of 10 to 110° C. to obtain an unstretched polypropylene film.

More preferably, the unstretched polypropylene film has a mesophase structure, and the mesophase fraction is preferably 20% or more, more preferably 40% or more, still more preferably 70% or more, and even more preferably 80% or more, most preferably 90% or more. In this regard, to calculate the mesophase fraction of the unstretched polypropylene film, the unstretched polypropylene film is subjected to measurement by wide angle X-ray diffraction, and the mesophase fraction is calculated with the use of the X-ray diffraction profile. The obtained X-ray diffraction profile is processed with peak separation software to separate it into mesophase, α-crystal, and amorphous profiles, and the mesophase fraction is calculated. Forming a mesophase or having a mesophase structure means that the mesophase fraction is 20% or more. The diffraction profile derived from the α crystal is composed of five peaks around 14.1 degrees, around 16.9 degrees, around 18.6 degrees, around 21.6 degrees, and around 21.9 degrees, which is observed in the wide angle X-ray diffraction measurement with a diffraction angle (2θ) of 10 to 30 degrees. The diffraction profile derived from the mesophase is composed of two broad peaks around 15 degrees and 21 degrees. The diffraction profile derived from the amorphous is a broad peak with a diffraction angle around 16.2 degrees, which is obtained from measurement of polypropylene in a molten state by wide angle X-ray diffraction.

Any of an electrostatic application method, a method of attachment with the use of the surface tension of water, an air knife method, a press roll method, an underwater casting method, an air chamber method and the like may be used as a method for attaching the molten sheet to the casting drum, but the air knife method is preferred because the method provides favorable flatness and has the ability to control surface roughness. Furthermore, it is preferable to appropriately adjust the position of the air knife such that air flows downstream of the film formation to not cause the film to vibrate.

From the viewpoints of improving the mechanical properties of the biaxially stretched film, improving the electrical properties thereof, controlling the crystallite size to be small, and increasing the glossiness of the surface, the temperature of the casting drum is more preferably 10 to 90° C., even more preferably 10 to 60° C., most preferably 10 to 30° C. In particular, when the temperature of the casting drum is adjusted to 10 to 90° C., β-spherocrystals are not excessively large, thereby making it easy to achieve the effect of increasing the withstanding voltage and, furthermore, the adjustment of the temperature to 10 to 30° C. increases the mesophase fraction of the unstretched polypropylene film, thereby allowing the unstretched polypropylene film to have a mesophase structure.

Next, the unstretched polypropylene film is subjected to biaxial drawing to be biaxially oriented. The unstretched polypropylene film is preheated by passing the film between rolls maintained at 70 to 150° C., preferably 80 to 140° C., and with the unstretched polypropylene film continuously maintained at a temperature of 70° C. to 150° C., preferably 80 to 140° C., the film is subjected to drawing 2 to 15 times, preferably 4.5 to 12 times, more preferably 5.5 to 10 times in the longitudinal direction, and then cooled to room temperature. In this regard, the polypropylene film preferably has a step of drawing an unstretched polypropylene film that has a mesophase structure twice or more in one direction, from the viewpoint of improving the withstanding voltage of the film. When the mesophase fraction of the unstretched polypropylene film is 20% or more, the film is preheated by passing the film between rolls maintained at 80 to 130° C., preferably 90 to 120° C., and with the unstretched polypropylene film continuously maintained at a temperature of 80° C. to 130° C., preferably 90 to 120° C., the film is subjected to drawing 2 to 15 times, preferably 4.6 to 12 times, more preferably 5.0 to 11 times, most preferably 5.6 to 10 times in the longitudinal direction, and then cooled to room temperature.

Then, the film subjected to the uniaxial drawing in the longitudinal direction is, with an end thereof held by a clip, guided to a tenter. In this regard, it is preferable to adjust the temperature of the preheating step immediately before the drawing in the width direction to a drawing temperature in the width direction +5 to +15° C., preferably +5 to +12° C., more preferably +5 to +10° C., from the viewpoint of strengthening the fibril structure highly oriented in the longitudinal direction to improve the degree of crystallinity, thereby increasing the elastic modulus of the film surface and relaxing in advance molecular chains insufficiently oriented in the drawing process in the longitudinal direction to relieve excessive tension, thereby improving the thermal dimensional stability and, furthermore, the viewpoint of making it possible to provide the significantly protruded shapes of the film surface fibrils oriented by the drawing in the longitudinal direction remarkable, thereby forming film surface unevenness after the biaxial drawing. When the preheating temperature is lower than the drawing temperature +5° C., the degree of crystallinity and thermal dimensional stability may fail to be improved, or surface unevenness may fail to be formed and, on the other hand, when the preheating temperature is higher than the drawing temperature +15° C., the film may be broken in the drawing step.

Then, the temperature at which the film is, with an end thereof held by a clip, subjected to drawing in the width direction (the drawing temperature in the width direction) is 140 to 170° C., preferably 145 to 160° C., and the drawing is performed 7 to 15 times, more preferably 9 to 12 times, most preferably 9.2 to 11.5 times in the width direction.

In this regard, the area magnification is preferably 50 times or more, from the viewpoint of improving the voltage resistance. The area magnification is obtained by multiplying the draw ratio in the longitudinal direction by the draw ratio in the width direction. The area magnification is more preferably 55 times or more, particularly preferably 60 times or more.

In the production, in the subsequent heat treatment and relaxation treatment step, it is preferable to perform a multi-stage heat treatment of: performing heat fixation at a temperature of 145° C. or higher and 165° C. or lower (first-stage heat treatment temperature) while providing a relaxation of 2 to 20% in the width direction with a tension held by a clip in the width direction (first-stage heat treatment); then performing a heat treatment under the condition at 130° C. or higher and lower than the heat fixation temperature (first-stage heat treatment temperature), again with a tension held by the clip in the width direction (second-stage heat treatment); and performing heat fixation (third-stage heat treatment) under the condition at 80° C. or higher and lower than the heat fixation temperature (second-stage heat treatment temperature), further with a tension held, from the viewpoint of improving the uniformity of the film thickness, the surface elastic modulus, and thermal dimensional stability, and achieving voltage resistance and reliability in use as a capacitor. In addition, the multi-stage heat treatment is also preferred from the viewpoint of sufficiently fixing and stabilizing the molecular chain orientation advanced by the drawing, thereby improving the degree of crystallinity and thus increasing the 1 stRUN melting peak temperature ($T_{m1}$), and improving the thermal dimensional stability and, thus, achieving voltage resistance and reliability in use as a capacitor.

In the relaxation treatment, from the viewpoint of improving the thermal dimensional stability, the relaxation rate is preferably 2 to 20%, more preferably 5 to 18%, and even more preferably 8 to 15%. If the relaxation rate exceeds 20%, the film may be slack inside the tenter, thereby causing wrinkles on the product and then causing unevenness during vapor deposition, or resulting in deteriorated mechanical properties and, on the other hand, if the relaxation rate is less than 2%, sufficient thermal dimensional stability fails to be achieved, thereby causing a decrease in capacitance or short circuit breakdown under high-temperature environments in use as a capacitor.

After the multi-stage heat treatment, the film is guided to the outside of the tenter, the clip at the film end is released in an atmosphere at room temperature, the film edge is slit in a winder step, and a film product roll of 0.5 μm or more to less than 10 μm in film thickness is wound. In this regard, to improve the adhesion of vapor-deposited metal to the surface subjected to vapor deposition before winding the film, the surface is subjected to a corona discharge treatment in the air, nitrogen, carbon dioxide or a mixed gas thereof.

Further, here are specific examples of the film formation conditions for obtaining the polypropylene film.
The CXS of polypropylene resin is less than 1.5% by mass.
The area magnification is 50 times or more for drawing.
The preheating temperature before the drawing in the width direction is the drawing temperature in the width direction +5 to +15° C.
The first-stage heat treatment temperature is 145° C. or higher and 165° C. or lower.

The second-stage heat treatment temperature is 130° C. or higher and lower than the first-stage heat treatment temperature.
The third-stage heat treatment temperature is 80° C. or higher and lower than the second-stage heat treatment temperature.
In the first-stage heat treatment step, a relaxation treatment from 2 to 20% is performed in the width direction.
The film thickness is 0.5 μm or more and less than 10 μm.

To improve the dielectric withstanding voltage under high-temperature environments, it is preferable to suppress the structural relaxation of the outermost layer which is high in crystallinity and likely to be exposed to a thermal stress during film formation, thereby keeping the surface elastic modulus of the film high.

Subsequently, a metal layer laminated film obtained with the use of the polypropylene film, a film capacitor obtained with the use of the film, and manufacturing methods therefor will be described. The metal layer laminated film has a metal film provided on at least one surface of the polypropylene film. Furthermore, the method of manufacturing the metal layer laminated film has a metal film providing step of providing a metal film on at least one surface of the polypropylene film obtained by the above-mentioned method of manufacturing the polypropylene film. The method for the metal film providing step is not particularly limited but, for example, a method is preferably used in which aluminum or an alloy of aluminum and zinc is vapor-deposited on at least one surface of the polypropylene film to provide a metal film that serves as an internal electrode of a film capacitor. In this example, other metal components such as nickel, copper, gold, silver, and chromium can be also vapor-deposited simultaneously or sequentially with aluminum. In addition, a protective layer can be also provided on the vapor-deposited film with the use of an oil or the like. When the surface roughness of the polypropylene film is different between the front and back surfaces, the metal layer laminated film is preferably provided by providing a metal film on the front surface with roughness smoothened, from the viewpoint of increasing the voltage resistance.

If necessary, after the metal film is formed, the metal layer laminated film can be subjected to an annealing treatment or a heat treatment at a specific temperature. In addition, for insulation or other purposes, at least one surface of the metal layer laminated film can be coated with a polyphenylene oxide or the like. The metal layer laminated film, thus, obtained can be laminated or wound by various methods to obtain a film capacitor. Here is an example of a preferred method of manufacturing a wound film capacitor. Aluminum is vapor-deposited on one surface of the polypropylene film under reduced pressure. In that regard, the vapor deposition is performed in a stripe shape with a margin part extending in the longitudinal direction. Next, the center of each vapor deposition part and the center of each margin part on the surface are slit with a blade to create tape-shaped take-up reels that each has one surface with a margin. Two of the tape-shaped take-up reels with margins on the right or left side, which respectively have right and left margins, are stacked on top of one another such that the vapor deposition parts protrude from the margin parts in the width direction, and then wound to obtain a wound body.

In performing vapor deposition on both surfaces, the vapor deposition on one surface is performed in a stripe shape with a margin part running in the longitudinal direction, whereas the vapor deposition on the other surface is performed in a stripe shape such that the margin part in the longitudinal direction is located at the center of the vapor deposition part on the back surface. Next, the respective centers of the front and back margin parts are slit with a blade to prepare a tape-shaped take-up reel with a margin on each side (for example, if the front surface has a margin on the right side, the back surface has a margin on the left side). The obtained reel and an interleaving film subjected to vapor deposition, both of the two are stacked on top of one another such that the metal layer laminated film protrudes from the interleaving film in the width direction, and then wound to obtain a wound body.

The wound body created in the way described above is pressed with the core material removed from the wound body, and metallicon is sprayed onto both end surfaces to provide external electrodes, and lead wires are welded to the metallicon to obtain a wound film capacitor. Film capacitors cover a wide variety of applications such as rail vehicles, automobiles (hybrid cars, electric cars), solar power generation/wind power generation, and general household appliances, and the film capacitor can also be used suitably for these applications. In addition, the film capacitor can be also used in various applications such as packaging films, release films, process films, sanitary products, agricultural products, building products, and medical products.

Here are methods of measuring characteristic values and methods of evaluating effects.

(1) Film Thickness

The thicknesses at ten arbitrary sites of the polypropylene film were measured with the use of a contact-type electronic micrometer (K-312A type) manufactured by ANRITSU CORPORATION under an atmosphere at 23° C. and 65% RH. The average value for the thicknesses at the ten sites was regarded as the film thickness of a polypropylene film.

(2) Elastic Modulus of Film Surface (Nanoindentation Measurement)

The polypropylene film was cut into a square of 1 cm×1 cm, and an epoxy resin (Araldite Rapid (rapid curing type)) was applied onto a silicon wafer to be 10 to 50 μm in thickness, the measurement surface of the film was fixed onto the epoxy resin, and the elastic modulus of the film surface was calculated by the following method under the following conditions with the use of "ultra-microhardness tester, Nano Indenter XP manufactured by MTS Systems Corporation".

Measurement device: ultra-microhardness tester, Nano Indenter XP manufactured by MTS Systems Corporation
Measurement method: nanoindentation measurement (continuous stiffness measurement method)
Indenter used: diamond triangular pyramid indenter
Measurement atmosphere: room temperature in the air
The number n of measurement tests: five times The stationary sample was subjected to an indentation load/unloading test with the use of the triangular pyramid indenter (Berkovich indenter) to obtain a diagram of load (P)-indentation depth (h). The relationship of formula (1) is established between the composite elastic modulus E*(Pa) including the contribution of elastic deformation of the indenter and the initial gradient dP/dh at unloading in the diagram of the load (P)-indentation depth (h).

$$\frac{dP}{dh} = \beta \frac{2}{\sqrt{\pi}} \sqrt{A} E^* \quad (1)$$

In the formula, β represents a constant determined by the shape of the indenter, and in the Berkovich indenter, β=1.034. Furthermore, the composite elastic modulus is expressed as in formula (2).

$$\frac{1}{E^*} = \frac{1-v^2}{E} + \frac{1-v_i^2}{E_i} \quad (2)$$

In the formula, v (−) and E(Pa) represent the Poisson ratio and elastic modulus of the sample, and $v_i$ and $E_i$ represent the Poisson ratio and elastic modulus of the indenter. In using a diamond indenter, the elastic modulus $E/(1-v^2)$ including the Poisson's ratio of the sample is calculated from formulas (1) and (2) with the use of known $E_i$ and $v_i$.

Next, the dP/dh in equation (1) was calculated with the use of the following continuous stiffness measurement method. The continuous stiffness measurement method refers to a method of causing the indenter to undergo a microvibration during an indentation test, obtaining the response amplitude and the phase difference with respect to the vibration as a function of time, and continuously calculating the dP/dh in response to the continuous change of the indentation depth, and the measurement principle is shown in the FIGURE.

The total force (detected load component) F(t) in the direction in which the indenter enters the sample is expressed by formula (3).

$$F(t) = m\frac{d^2h}{dt^2} + D\left(\frac{dh}{dt}\right) + Kh \quad (3)$$

In the formula, the first term of formula (3) represents the force derived from the indenter shaft (m: the mass of the indenter shaft (g)), the second term of formula (3) refers to the force derived from the viscous component of the sample and indenter system (D: loss constant (−)), the third term of formula (3) represents the composite force of: the compliance of the sample and load system frame (load frame); and the stiffness of a leaf spring that supports the indenter shaft (K: composite stiffness), and t (seconds) represents time. The D and K in formula (3) are expressed in formulas (4) and (5).

$$K = \left\{\left(\frac{dh}{dP}\right) + C_f\right\}^{-1} + K_s \quad (4)$$

$$D = D_s + D_i \quad (5)$$

In the formulas, $C_f$ represents the compliance of the load frame, $K_s$ represents the stiffness of the leaf spring that supports the indenter shaft, $D_s$ represents the loss constant of the indenter system, and $D_i$ represents the loss constant of the sample. In addition, F(t) of formula (3), which depends on time, is, thus, expressed as in formula (6).

$$F(t) = F_0 \exp(i\omega t) \quad (6)$$

In the formula, $F_0$ represents a constant, and ω represents an angular frequency (Hz). Substituting formula (6) into formula (3), then substituting formula (7), which is a special solution of an ordinary differential equation, and solving the equation calculate dP/dh as in formula (8).

$$h = h_0 \exp\{i(\omega t - \phi)\} \quad (7)$$

$$\frac{dP}{dh} = \left[ \frac{1}{(F_0/h_0)\cos\phi - (K_s - m\omega^2)} - C_f \right]^{-1} \quad (8)$$

In the formula, φ represents a phase difference. In formula (8), Cf, m, and $K_s$ are known at the time of the measurement. Thus, dP/dh can be calculated continuously from formula (8) to correspond to the continuous change of the indentation depth by measuring the vibration amplitude ($h_0$), phase difference (φ), and excitation vibration amplitude ($F_0$) of displacement at the time of the film measurement. Then, the elastic modulus E of the film surface was calculated in accordance with formulas (1) and (2) with the values obtained by the calculation and the Poisson's ratio of the film=0.4. The measurement was performed five times, and the average value was determined.

The indentation depth range of 40 to 200 nm for shallow indentation depth was and substantially constant elastic modulus was selected for calculating the elastic modulus. In addition, both surfaces of the film are subjected to the measurement, and the value of the surface with a higher elastic modulus is used.

(3) Heat Shrinkage Rate after Heat Treatment at 130° C. for Ten Minutes

The polypropylene film was cut into five samples of 10 mm in width and 30 mm in length (measurement direction), and the samples were marked at positions of 5 mm from both ends for a test length of 20 mm ($l_0$). Next, the test pieces were put into paper, heated for ten minutes in an oven kept at 130° C. with zero load, then taken out, and cooled at room temperature, the changed test length dimension ($l_1$) was then measured, and from the formula:

heat shrinkage rate=$\{(l_0-l_1)/l_0\}\times 100(\%)$

The average value for the five samples was regarded as the heat shrinkage rate. The measurement was performed in each of the film width direction and longitudinal direction.

(4) Film Melting Peak Temperature and Heat of Melting (DSC2ndRUN Melting Peak Temperature $T_{m2}$ and DSC2ndRUN Heat of Melting in Range from 100° C. to 180° C. in DSC2ndRUN)

With the use of a differential scanning calorimeter (EXSTAR DSC6220 manufactured by Seiko Instruments Inc.), sample is a 3 mg of a polypropylene film, the temperature is increased from 30° C. to 260° C. under the condition of 20° C./min in a nitrogen atmosphere. Then, after holding at 260° C. for five minutes, the temperature is decreased down to 30° C. under the condition of 20° C./min. Furthermore, after holding at 30° C. for five minutes, the temperature is increased again from 30° C. to 260° C. under the condition of 20° C./min. The peak temperature of the endothermic curve obtained in increasing the temperature again was regarded as DSC2ndRUN melting peak temperature ($Tm_2$). In addition, in the DSC curve obtained by the measurement mentioned above, the heat of melting of 100° C. to 180° C. was calculated as the total heat quantity of melting of 100° C. to 180° C. in the DSC2ndRUN. The number n of measurements performed was 3, and the average value was used for each of ($T_{m2}$) and heat of melting.

(5) Film Melting Peak Temperature (DSC1stRUN Melting Peak Temperature $T_{m1}$)

With the use of a differential scanning calorimeter (EXSTAR DSC6220 manufactured by Seiko Instruments Inc.), sample is a 3 mg of polypropylene film, the temperature is increased from 30° C. to 260° C. under the condition of 20° C./min in a nitrogen atmosphere. The peak temperature of the endothermic curve obtained in increasing the temperature was regarded as DSC1stRUN melting peak temperature ($T_{m1}$). The number n of measurements performed was 3, and the average value was used for ($T_{m1}$).

(6) Difference Between Stress at 80% Elongation (F80 Value) and Stress at 30% Elongation (F30 Value) in Film Longitudinal Direction The polypropylene film was cut into, as a sample, a rectangular shape of 10 mm in width and 150 mm in length (measurement site: 50 mm in the center) in the longitudinal direction. Next, the rectangular sample was set in a tensile tester (Tensilon UCT-100 manufactured by ORIENTEC CORPORATION) at an initial chuck-to-chuck distance of 20 mm, and the film was subjected to a tensile test at a tensile speed of 300 mm/min under an environment at 23° C. and 65% RH. The loads applied to the film respectively at 30% and 80% sample elongations were read, and divided by the cross-sectional area (film thickness×width (10 mm)) of the sample before the test to calculate the values as stress at the 80% elongation (F80 value) and stress at the elongation of 30% (F30 value) (unit: MPa for each), the measurement was performed five times for each sample, and the average values were used for evaluation. The difference between the average F80 and F30 values obtained was determined. The value measured in the section (1) mentioned above was used for the film thickness used for the calculation of the F80 and F30 values.

(7) Film Breakdown Voltage at 130° C. (V/μm)

After the film was heated for one minute in an oven kept at 130° C., the breakdown voltage was measured in the atmosphere in accordance with JIS C2330 (2001) 7.4.1.11.2 B method (plate electrode method). For the lower electrode, however, an electrode was used which was obtained by placing, on the metal plate described in Method B of JIS C2330 (2001) 7.4.11.2, "Conductive Rubber E-100<65>" manufactured by Togawa Rubber Company Limited with the same dimensions. The breakdown voltage test was performed 30 times, the obtained values were divided by the film thickness (section (1) mentioned above) and converted to (Wpm), and among the 30 measured values (calculated values) in total, the average value for the 20 points excluding five points in descending order from the maximum value and five points in ascending order from the minimum value was regarded as the film breakdown voltage at 130° C.

(8) Three-Dimensional Center Plane Average Roughness SRa and Ten-Point Average Roughness SRz The three-dimensional surface roughness was measured under the following conditions with the use of surf-corder ET-4000A manufactured by Kosaka Laboratory Ltd.
Device: "surf-corder ET-4000A" manufactured by Kosaka Laboratory Ltd.
Analysis software: i-Face model TDA31
Stylus tip radius: 0.5 μm
Field of view: X direction: 1000 μm Pitch: 5 μm
Y direction: 250 μm Pitch: 10 μm
Stylus pressure: 50 μN
Measurement speed: 0.1 mm/s
Cutoff value: low range 0.2 mm, high range—none
Leveling: all
Filter: Gaussian filter (spatial type)
Magnification: 20,000 times.

The sample set was set on a sample stage, such that the X direction of the measurement visual field coincided with the width direction of the polypropylene film, with the upper surface as a measurement surface. The roughness was measured ten times at different sites under the conditions mentioned above, the respective average values for three-dimensional center plane surface roughness were calculated and regarded as SRa, and the respective average values for ten-point average roughness were calculated and regarded as SRz. Both front and back surfaces of the film were subjected to the measurement, and the surface with a smaller measured value was used as a surface for the evaluation of the three-dimensional center plane average roughness SRa and ten-point average roughness SRz of the polypropylene film.
(9) Arithmetic Mean Height (Sa), Maximum Height (Sz), The measurement was performed with the use of VertScan2.0 R5300GL-Lite-AC manufactured by Ryoka Systems Inc. The undulation component was removed from a shot image by polynomial fourth-order approximation surface correction with the use of attached analysis software, and interpolation processing (processing of compensating for pixels for which height data fails to be acquired, with height data calculated from surrounding pixels) was then performed. Sa and Sz were determined on the basis of ISO25178, and the average value was calculated for measurements at any five sites in one of the surfaces. Here are measurement conditions:
Manufacturer: Ryoka Systems Inc.
Device name: VertScan 2.0 R5300GL-Lite-AC
Measurement conditions: CCD camera SONY HR-57 ½ inch
Objective lens 10×
Intermediate lens 0.5×
Wavelength filter 520 nm white
Measurement mode: phase
Measurement software: VS-Measure Version 5.5.1
Analysis software: VS-Viewer Version 5.5.1
Measurement area: 1.252×0.939 mm².
(10) Mass % of Cold Xylene Soluble Component (Hereinafter CXS)

As for the polypropylene resin in a raw material or the film sample in a film, 0.5 g of the resin or sample was dissolved in 100 ml of xylene at 135° C. and allowed to cool, and then recrystallized in a constant temperature water tank at 20° C. for one hour. Thereafter, the recrystallized polypropylene was removed by filtration, and the polypropylene-based component dissolved in the filtrate was quantified by liquid chromatography (X (g)). The xylene of the filtrate contains polypropylene with a relatively low molecular weight. With the use of the precision value (X0 (g)) of 0.5 g of the sample, the CXS was calculated from the formula:

$$CXS\ (\%) = (X/X0) \times 100$$

(11) Mesopentad Fraction

As for the polypropylene resin in a raw material or the film sample in a film, the resin or the sample is powdered by frost grinding, extracted with n-heptane at 60° C. for two hours, dried under reduced pressure at 130° C. for two hours or longer after removing impurities and additives in polypropylene, and used as a sample. The sample was dissolved in a solvent, and the mesopentad fraction (mmmm) (unit:%) was determined with the use of $^{13}$C-NMR under the following conditions:
Measurement Conditions
 Instrument: DRX-500 manufactured by Bruker
 Measurement nucleus: $^{13}$C nucleus (resonance frequency: 125.8 MHz)
 Measurement concentration: 10% by mass
 Solvent: benzene:heavy orthodichlorobenzene=1:3 mixed solution (ratio by volume)
 Measurement temperature: 130° C.
 Spin rotation speed: 12 Hz
 NMR sample tube: 5 mm tube
 Pulse width: 45° (4.5 μs)
 Pulse repetition time: 10 seconds
 Data point: 64 K
 Cumulated number: 10000 times
 Measurement mode: complete decoupling
Analysis Conditions Fourier transformation was performed with a LB (Line Broadening Factor) of 1, with the mmmm peak at 21.86 ppm. Peak splitting is performed with the use of WINFIT software (manufactured by Bruker). In that regard, the peak splitting is performed from the peak on the high magnetic field side as shown below, furthermore, automatic fitting is performed with software to optimize the peak splitting, and the total peak fraction of mmmm is then regarded as the mesopentad fraction (mmmm).
(1) mrrm
(2) (3) rrrm (divided as two peaks)
(4) rrrr
(5) mrmr
(6) mrmm+rmrr
(7) mmrr
(8) rmmr
(9) mmmr
(10) mmmm The same measurement was performed five times for the same sample, and the average value for the obtained mesopentad fractions was regarded as the mesopentad fraction of the sample.
(12) Mesophase Fraction of Unstretched Polypropylene Film (Wide Angle X-Ray Diffraction)

The unstretched polypropylene film after the casting step was cut into 10 mm in the width direction and 20 mm in the longitudinal direction. With the use of the sample, a measurement was performed at room temperature at a diffraction angle (2θ) of 5 to 30 degrees. Here are detailed measurement conditions below:
Instrument: nano viewer (Rigaku Corporation)
Wavelength: 0.15418 nm
X-ray incident direction: Through direction (incident perpendicular to the film surface)
Measurement time: 300 seconds Next, the obtained diffraction profile is processed with peak separation software to separate the three components of mesophase, α-crystal, and amorphous profiles. IGOR Pro (Ver. 6) software manufactured by WaveMetrics, Inc was used as analysis software. For conducting the analysis, the following assumptions were made.
 Peak shape function: Lorentz function
 Peak positions: amorphous=16.2 degrees, mesophase=15.0 degrees, 21.0 degrees
 α crystal=14.1 degrees, 16.9 degrees, 18.6 degrees, 21.6 degrees, 21.9 degrees
 Peak half width: amorphous=8.0, mesophase (15.0 degrees)=3.5, mesophase (21.0 degrees)=2.7

The half widths of the amorphous and mesophase are fixed at the values mentioned above, but the α crystal is not fixed.

For the obtained peak separation results, the calculated areas ($m_{15}$ and $m_{21}$) of the diffraction profiles with peaks at 15 degrees and 21 degrees derived from the mesophase, and the calculated areas ($\alpha_{14.1}$, $\alpha_{16.9}$, $\alpha_{18.6}$, $\alpha_{21.6}$, and $\alpha_{21.9}$) of the diffraction profiles with peaks at 14.1 degrees, 16.9 degrees, 18.6 degrees, 21.6 degrees, and 21.9 degrees derived from the α crystal were used for the calculation in accordance with the formula:

$$\text{mesophase fraction } (\%) = 100 \times (m_{15} + m_{21})/(m_{15} + m_{21} + \alpha_{14.1} + \alpha_{16.9} + \alpha_{18.6} + \alpha_{21.6} + \alpha_{21.9})$$

thereby determining the proportion of the area of the profile derived from the mesophase, and this proportion was regarded as the mesophase fraction.

(13) Glossiness of Film

In accordance with JIS K-7105 (1981), in measuring the surface close to the casting drum contact surface under the conditions of incidence angle: 60° and light receiving angle: 60° with the use of a digital variable angle glossmeter UGV-5D manufactured by Suga Test Instruments Co., Ltd., the average value for the data at five points was regarded as the glossiness (%).

(14) Coefficient of Static Friction (μs)

With the use of a slip tester manufactured by Toyo Seiki Seisaku-sho, Ltd., the coefficient of static friction was measured at 25° C. and 65% RH in accordance with JIS K 7125 (1999). The measurement was performed with the film longitudinal direction matched and one surface of the film and the opposite surface overlapped with each other. The number n of tests performed was five times, and the average value for the obtained values was calculated, and regarded as the coefficient of static friction (μs) of the sample.

(15) Evaluation of Film Capacitor Characteristics (Withstanding Voltage and Reliability at 115° C.)

On the film surfaces subjected to a corona discharge treatment, of the films obtained according to each Example and Comparative Example to be described later (of both film surfaces, the film surface that was higher in wetting tension, if the film treatment surface was unknown), aluminum was deposited with a vacuum deposition machine manufactured by ULVAC, Inc. in a deposition pattern including a so-called T-shaped margin pattern with a margin part provided in a direction perpendicular to the longitudinal direction with a film resistance of 8 Ω/sq, thereby providing a vapor deposition reel of 50 mm in width.

Then, with the use of this reel, the capacitor element was wound up by an element winding machine (KAW-4NHB) manufactured by KAIDO MANUFACTURING CO., LTD., and after applying metalicon, subjected to a heat treatment at a temperature of 128° C. for ten hours under reduced pressure, and lead wires were attached to complete the capacitor element. With the use of ten of the thus obtained capacitor elements, a so-called step-up test was performed, in which a voltage of 250 VDC was applied to the capacitor elements under a high temperature of 115° C., and after a lapse of ten minutes at the voltage, the applied voltage was gradually increased in steps at 50 VDC/1 minute in a repeated manner.

Element Processability

The element processability was determined on the basis of the following criteria. Capacitor elements were created in the same manner as mentioned above, and the shapes of the elements were confirmed visually.

A: The end surface film of the capacitor element is not displaced, wrinkled or deformed, on a level that does not interfere with the subsequent process at all.

B: The capacitor element is slightly deformed, on a level without any problem in the subsequent process.

C: The capacitor element is deformed, wrinkled, and displaced at the end surface, on a level that interferes with the subsequent process.

A and B are usable. It is difficult to put C into practical use.

Withstanding Voltage

The capacitance change was measured and plotted on a graph, and the voltage at which the capacitance reached 70% of the initial value was divided by the thickness of the film (section (1) mentioned above) for withstanding voltage evaluation, and evaluated as follows. The results are shown in Table 1.

S: 400 V/μm or more
A: 390 V/μm or more and less than 400 V/μm
B: 380 V/μm or more and less than 390V/μm
C: less than 380 V/μm S, A, and B are usable. C is inferior in practical performance.

Reliability

After the voltage was increased until the capacitance was decreased to 8% or less of the initial value, the capacitor element was disassembled to examine the degree of breakdown, and the reliability was evaluated as follows.

A: There is no change in element shape, and no penetrating breakdown observed.

B: There is no change in element shape, and penetrating destruction observed within ten layers of the film.

C: There is a change found in element shape, or penetrating destruction observed in excess of ten layers.

D: The element shape is destroyed.

A can be used without problems, and B can be used depending on conditions. C and D are inferior in practical performance.

EXAMPLES

Hereinafter, the advantageous effect will be further described with reference to examples. The elastic modulus (nanoindentation measurement) of the film surface according to each example or comparative example was measured with the casting drum contact surface as a measurement surface.

Example 1

The polypropylene resin raw material (1) manufactured by Prime Polymer Co., Ltd. with a mesopentad fraction of 0.982, a melting point of 168° C., a melt flow rate (MFR) of 2.2 g/10 min, and a cold xylene soluble component (hereinafter CXS) of 0.9% by mass was fed into an extruder at a temperature of 260° C., melted and extruded into a sheet form from a T-type slit die at a resin temperature of 260° C., and the molten sheet was cooled for solidification in closer contact with an air knife on a casting drum held at 25° C. to obtain an unstretched polypropylene film. The unstretched polypropylene film was preheated in a stepwise manner up to 83° C. with a plurality of roll groups, and subsequently passed through rolls maintained at 123° C. and provided with a difference in circumferential speed, and subjected to drawing 6.3 times in the longitudinal direction. Subsequently, the film was guided to a tenter, preheated at a temperature of 167° C. (TD preheating temperature in Table 1, 8° C. higher than the TD drawing temperature) with both ends held by clips in the film width, and then subjected to drawing 11.0 times in the width direction at a temperature of 159° C. (TD drawing temperature in Table 1). Furthermore, the film was subjected to, as the first-stage heat treatment and relaxation treatment, a heat treatment at 155° C. while applying 8% relaxation in the width direction, and further subjected to, as the second-stage heat treatment, a heat treatment at 140° C. with the film held by a clip in the width direction. Finally, as the third-stage heat treatment, the film was guided through a heat treatment at 120° C. to the outside of the tenter, the clip at the film end was released, the film surface (close to the casting drum contact surface) was then subjected to a corona discharge treatment at a treatment intensity of 25 W·min/m² in the atmosphere, and the film of 2.3 μm in film thickness was wound up as a film roll. Table 1 shows the polypropylene film characteristics and capacitor characteristics this example. Even under the high temperature environment, the film exhibited a high breakdown voltage, and the film was excellent in capacitor element processability, and excellent in both reliability and withstanding voltage as a capacitor.

Examples 2, 3, and 4

Examples 2, 3, and 4 used the raw materials (1). The examples were provided in the same way as in Example 1 except for the temperature of the casting drum for cooling the molten extruded sheet, draw ratio for biaxial drawing, TD preheating temperature, TD drawing temperature, and heat treatment conditions provided as shown in Table 1. According to Examples 2, 3, and 4, a polypropylene film of 2.4 μm in thickness, a polypropylene film of 2.3 μm in thickness, and a polypropylene film of 6.2 μm in thickness were obtained, respectively.

Table 1 shows the polypropylene film characteristics and capacitor characteristics according to the respective examples. Even under the high temperature environment, the films exhibited high breakdown voltages, and the polypropylene film according to Example 2 was excellent in capacitor element processability, on a practically acceptable level in terms of withstanding voltage as a capacitor, and excellent in reliability. The polypropylene film according to Example 3 was slightly inferior in capacitor element processability, but on a practically acceptable level, excellent in withstanding voltage as a capacitor, and also on a practically acceptable level in terms of reliability. The polypropylene film according to Example 4 was excellent in capacitor element processability, and on a practically acceptable level in terms of withstanding voltage and reliability as a capacitor.

Example 5

In the same way as in Example 1 except for the use of a polypropylene resin raw material (2) manufactured by Prime Polymer Co., Ltd. with a mesopentad fraction of 0.971, a melting point of 165° C., a melt flow rate (MFR) of 3.0 g/10 min, and a cold xylene soluble component (hereinafter CXS) of 1.3% by mass, and the temperature of the casting drum for cooling the molten extruded sheet, draw ratio for biaxial drawing, TD preheating temperature, TD drawing temperature, and heat treatment conditions provided as shown in Table 1, a polypropylene film of 2.4 μm in thickness was obtained. Table 1 shows the polypropylene film characteristics and capacitor characteristics according to this example. Even under the high temperature environment, the film exhibited a high breakdown voltage, and the film was excellent in capacitor element processability, on a practically acceptable level in terms of withstanding voltage and reliability as a capacitor.

Example 6

With the use of the raw material (1), a polypropylene resin was melted and extruded in the same way as in Example 1, and the temperature of the casting drum for cooling the sheet was adjusted to 92° C. to obtain an unstretched polypropylene film. Then, the unstretched polypropylene film was preheated in a stepwise manner up to 140° C. with a plurality of roll groups, and subsequently passed through rolls maintained at 145° C. and provided with a difference in circumferential speed, and subjected to drawing 6.2 times in the longitudinal direction. Subsequently, the film was guided to a tenter, preheated at a TD preheating temperature of 171° C. (this temperature was 9° C. higher than the TD drawing temperature) with both ends held by clips in the film width, and then subjected to drawing 11.0 times in the width direction at a TD drawing temperature of 162° C. Furthermore, the film was subjected to, as the first-stage heat treatment and relaxation treatment, a heat treatment at 155° C. while applying 8% relaxation in the width direction, and further subjected to, as the second-stage heat treatment, a heat treatment at 135° C. with the film held by a clip in the width direction. Finally, as the third-stage heat treatment, the film was guided through a heat treatment at 115° C. to the outside of the tenter, the clip at the film end was released, the film surface (close to the casting drum contact surface) was then subjected to a corona discharge treatment at a treatment intensity of 25 W·min/m² in the atmosphere, and the film of 2.4 μm in film thickness was wound up as a film roll. The polypropylene film according to this example was excellent in capacitor element processability, on a practically acceptable level in terms of reliability as a capacitor, and slightly inferior in withstanding voltage, but on a practically usable level.

Comparative Examples 1 and 2

Comparative Examples 1 and 2 used the raw materials (1) in the same way as in Example 1 except for and the temperature of the casting drum for cooling the molten extruded sheet, draw ratio for biaxial drawing, TD preheating temperature, TD drawing temperature, and heat treatment conditions provided as shown in Table 1, a polypropylene film of 2.4 μm in thickness and a polypropylene film of 2.3 μm in thickness were obtained, respectively, according to Comparative Examples 1 and 2. Table 1 shows the polypropylene film characteristics and capacitor characteristics according to the respective comparative examples.

In Comparative Example 1, the film surface elastic modulus was less than 2.6 GPa, and the sum of the heat shrinkage rates after the heat treatment at 130° C. for ten minutes also exceeded 5%. The polypropylene film was excellent in capacitor element processability, but insufficient in withstanding voltage as a capacitor, on a practically problematic level that such as penetrating destruction in the reliability evaluation. In Comparative Example 2, the surface elastic modulus of the film was not sufficient, and the polypropylene film was deformed, wrinkled, and displaced at the end surface in terms of capacitor element processability, on a practically acceptable level in withstanding voltage as a capacitor, but on a practically problematic level due to penetrating destruction in the reliability evaluation.

Comparative Example 3

In the same way as in Example 1 except for the use of a polypropylene resin raw material (3) manufactured by Prime Polymer Co., Ltd. with a mesopentad fraction of 0.965, a melting point of 164° C., a melt flow rate (MFR) of 3.2 g/10 min, and a cold xylene soluble component (hereinafter CXS) of 1.6% by mass, and the temperature of the casting drum for cooling the molten extruded sheet, draw ratio for biaxial drawing, TD preheating temperature, TD drawing temperature, and heat treatment conditions provided as shown in Table 1, a polypropylene film of 2.4 μm in thickness was obtained.

Table 1 shows the polypropylene film characteristics and capacitor characteristics according to this comparative example. The capacitor element processability was excellent, but the withstanding voltage as a capacitor was extremely low, and we found a change in element shape in the reliability evaluation on a practically intolerable level.

Comparative Example 4

In the same way as in Example 1 except for the use of a polypropylene resin raw material (4) manufactured by Prime Polymer Co., Ltd. with a mesopentad fraction of 0.980, a melting point of 166° C., a melt flow rate (MFR) of 2.5 g/10 min, and a cold xylene soluble component (hereinafter CXS) of 2.1% by mass, and the temperature of the casting drum for cooling the molten extruded sheet, draw ratio for biaxial drawing, TD preheating, TD drawing, and heat treatment conditions provided as shown in Table 1, a polypropylene film of 2.5 µm in thickness was obtained.

Table 1 shows the polypropylene film characteristics and capacitor characteristics according to this comparative example. The capacitor element processability was excellent, also with the withstanding voltage as a capacitor on a practically acceptable level, but we found a change in element shape in the reliability evaluation on a practically intolerable level.

Comparative Example 5

The Comparative Example 5 used the raw materials (1) in the same way as in Example 1 except that the TD preheating temperature was the same as the TD drawing temperature, and the first stage of the heat treatment condition was lower, whereas the second stage thereof was higher, without the third stage in accordance with the conditions in Table 1, a polypropylene film of 2.4 µm in thickness was obtained. Table 1 shows the polypropylene film characteristics and capacitor characteristics. The polypropylene film according to this comparative example was deformed, wrinkled, and displaced at the end surface in terms of capacitor element processability, on a practically acceptable level in withstanding voltage as a capacitor, but on a practically problematic level due to penetrating destruction in the reliability evaluation.

Comparative Example 6

The Comparative Example 6 used the raw materials (1) in the same way as in Example 1 except for without the third stage of the heat treatment condition, and the temperature of the casting drum for cooling the molten extruded sheet, draw ratio for biaxial drawing, and TD preheating and TD drawing temperatures provided as shown in Table 1, a polypropylene film of 2.4 µm in thickness was obtained. Table 1 shows the polypropylene film characteristics and capacitor characteristics. The polypropylene film according to this comparative example was excellent in capacitor element processability, on a practically acceptable level in withstanding voltage as a capacitor, but we found a change in element shape in the reliability evaluation on a practically intolerable level.

Comparative Example 7

With the use of a polypropylene resin raw material (5) manufactured by Prime Polymer Co., Ltd. with a mesopentad fraction of 0.972, a melting point of 165° C., a melt flow rate (MFR) of 2.7 g/10 min, and a cold xylene soluble component (hereinafter CXS) of 1.9% by mass, the resin was melted and extruded into a sheet form from a T-type slit die at a resin temperature of 260° C., and the molten sheet was cooled for solidification in closer contact with an air knife on a casting drum held at 90° C. to obtain an unstretched polypropylene film. The unstretched polypropylene film was preheated in a stepwise manner up to 140° C. with a plurality of roll groups, and subsequently passed through rolls maintained at 145° C. and provided with a difference in circumferential speed, and subjected to drawing 6.2 times in the longitudinal direction. Subsequently, the film was guided to a tenter, preheated at a TD preheating temperature of 170° C. (9° C. higher than the TD drawing temperature) with both ends held by clips in the film width, and then subjected to drawing 10.8 times in the width direction at a TD drawing temperature of 161° C. Furthermore, the film was subjected to, as the first-stage heat treatment and relaxation treatment, a heat treatment at 155° C. while applying 8% relaxation in the width direction, and further subjected to, as the second-stage heat treatment, a heat treatment at 140° C. with the film held by a clip in the width direction. Finally, as the third-stage heat treatment, the film was guided through a heat treatment at 110° C. to the outside of the tenter, the clip at the film end was released, the film surface (close to the casting drum contact surface) was then subjected to a corona discharge treatment at a treatment intensity of 25 W·min/m² in the atmosphere, and the film of 2.3 µm in film thickness was wound up as a film roll. The polypropylene film according to this comparative example was excellent in capacitor element processability, but insufficient in withstanding voltage as a capacitor, on a practically problematic level, such as penetrating destruction in the reliability evaluation.

TABLE 1

|  |  | Example 1 | Example 2 | Example 3 | Example 4 | Example 5 | Example 6 | Comparative Example 1 |
|---|---|---|---|---|---|---|---|---|
| Casting drum temperature | (° C.) | 25 | 28 | 20 | 20 | 25 | 92 | 30 |
| Mesophase fraction of unstretched film | (%) | 78 | 76 | 80 | 15 | 78 | 0 | 77 |
| Longitudinal draw ratio | (Times) | 6.3 | 6.1 | 6.4 | 5.2 | 6.2 | 6.2 | 4.6 |
| Lateral draw ratio | (Times) | 11.0 | 11.1 | 10.8 | 10.0 | 10.5 | 11.0 | 10.5 |
| Area magnification | (Times) | 69 | 68 | 69 | 52 | 65 | 68 | 48 |
| TD preheating temperature | (° C.) | 167 | 170 | 164 | 164 | 168 | 171 | 171 |
| TD drawing temperature | (° C.) | 159 | 157 | 159 | 159 | 158 | 162 | 160 |
| First stage heat treatment temperature | (° C.) | 155 | 154 | 145 | 155 | 156 | 155 | 155 |
| Second stage heat treatment temperature | (° C.) | 140 | 141 | 135 | 140 | 140 | 135 | — |
| Third stage heat treatment temperature | (° C.) | 120 | 122 | 90 | 120 | 118 | 115 | — |

TABLE 1-continued

| | | | | | | | | |
|---|---|---|---|---|---|---|---|---|
| Elastic modulus of film surface | (GPa) | 2.9 | 2.7 | 2.8 | 2.6 | 2.6 | 2.6 | 2.5 |
| Sum of heat shrinkage rates in film longitudinal and width directions at 130° C for 10 minutes | (%) | 3.4 | 3.1 | 4.9 | 4.8 | 4.2 | 4.4 | 5.1 |
| Mesopentad fraction of film | (—) | 0.982 | 0.982 | 0.982 | 0.982 | 0.971 | 0.982 | 0.982 |
| Cold xylene soluble component (CXS) of film | (% by mass) | 0.9 | 0.9 | 0.9 | 0.9 | 1.3 | 0.9 | 0.9 |
| Difference between F80 value and F30 value in film longitudinal direction | (MPa) | 62 | 52 | 54 | 51 | 56 | 52 | 43 |
| Three-dimensional center plane average roughness SRa | (nm) | 25 | 35 | 12 | 38 | 23 | 75 | 23 |
| Three-dimensional ten-point average roughness SRz | (nm) | 280 | 335 | 125 | 402 | 271 | 589 | 274 |
| DSC 2ndRUN melting peak temperature ($T_{m2}$) | (° C.) | 168 | 168 | 168 | 168 | 165 | 168 | 168 |
| Heat of melting in range from 100° C. to 180° C. in DSC 2ndRUN | (J/g) | 113 | 113 | 113 | 113 | 109 | 113 | 113 |
| Arithmaic mean height Sa | nm | 7.8 | 8.2 | 5.5 | 8.8 | 7.5 | 17.2 | 7.5 |
| Maximum height Sz | nm | 135 | 145 | 85 | 160 | 121 | 495 | 128 |
| Glossiness | (%) | 146 | 146 | 150 | 146 | 148 | 135 | 143 |
| DSC 1stRUN melting peak temperature ($T_{m1}$) | (° C.) | 179 | 178 | 177 | 175 | 175 | 178 | 173 |
| Film breakdown voltages 130° C. | (V/μm) | 452 | 419 | 440 | 402 | 413 | 392 | 366 |
| Coefficient of static friction (μs) | (—) | 0.89 | 0.82 | 1.4 | 0.88 | 0.79 | 0.65 | 0.81 |
| Film thickness | (μm) | 2.3 | 2.4 | 23 | 6.2 | 2.4 | 2.4 | 2.4 |
| Capacitor element workability | — | A | A | B | A | A | A | A |
| Capacitor characteristics 115° C. Withstanding voltage | | S | A | S | A | A | B | C |
| Reliability | | A | A | B | B | B | B | D |

| | | Comparative Example 2 | Comparative Example 3 | Comparative Example 4 | Comparative Example 5 | Comparative Example 6 | Comparative Example 7 |
|---|---|---|---|---|---|---|---|
| Casting drum temperature | (° C.) | 25 | 28 | 25 | 25 | 28 | 90 |
| Mesophase fraction of unstretched film | (%) | 78 | 76 | 76 | 78 | 76 | 0 |
| Longitudinal draw ratio | (Times) | 6.2 | 5.4 | 6.1 | 6.3 | 6.1 | 6.2 |
| Lateral draw ratio | (Times) | 11.0 | 10.5 | 10.5 | 11.0 | 11.5 | 10.8 |
| Area magnification | (Times) | 68 | 57 | 64 | 69 | 70 | 67 |
| TD preheating temperature | (° C.) | 158 | 172 | 168 | 159 | 165 | 170 |
| TD drawing temperature | (° C.) | 158 | 159 | 156 | 159 | 160 | 161 |
| First stage heat treatment temperature | (° C.) | 152 | 150 | 156 | 128 | 155 | 155 |
| Second stage heat treatment temperature | (° C.) | 142 | 135 | 140 | 138 | 140 | 140 |
| Third stage heat treatment temperature | (° C.) | 115 | 80 | 110 | — | — | 110 |
| Elastic modulus of film surface | (GPa) | 2.3 | 2.4 | 2.6 | 2.4 | 2.4 | 2.3 |
| Sum of heat shrinkage rates in film longitudinal and width directions at 130° C for 10 minutes | (%) | 3.9 | 4.6 | 5.2 | 5.1 | 4.5 | 5.1 |
| Mesophase fraction of film | (—) | 0.982 | 0.965 | 0.980 | 0.982 | 0.982 | 0.972 |
| Cold xylene soluble component (CXS) of film | (% by mass) | 0.9 | 1.6 | 2.1 | 0.9 | 0.9 | 1.9 |
| Difference between F80 value and F30 value in film longitudinal direction | (MPa) | 51 | 48 | 52 | 49 | 51 | 49 |
| Three-dimensional center plane average roughness SRa | (nm) | 7 | 24 | 22 | 7 | 22 | 78 |
| Three-dimensional ten-point average roughness SRz | (nm) | 68 | 265 | 235 | 72 | 275 | 602 |
| DSC 2ndRUN melting peak temperature ($T_{m2}$) | (° C.) | 168 | 164 | 166 | 168 | 168 | 165 |
| Heat of melting in range from 100° C. to 180° C. in DSC 2ndRUN | (J/g) | 113 | 104 | 106 | 113 | 113 | 105 |
| Arithmaic mean height Sa | nm | 4.2 | 7.3 | 7.6 | 4.8 | 7.3 | 22.1 |
| Maximum height Sz | nm | 55 | 127 | 126 | 58 | 128 | 505 |
| Glossiness | (%) | 152 | 149 | 148 | 151 | 148 | 129 |
| DSC 1stRUN melting peak temperature ($T_{m1}$) | (° C.) | 174 | 172 | 174 | 177 | 178 | 173 |
| Film breakdown voltages 130° C. | (V/μm) | 421 | 395 | 413 | 391 | 418 | 362 |
| Coefficient of static friction (μs) | (—) | 2.1 | 0.91 | 0.89 | 2.1 | 0.81 | 0.62 |
| Film thickness | (μm) | 2.3 | 2.4 | 23 | 2.4 | 2.4 | 2.4 |
| Capacitor element workability | — | C | A | A | C | A | A |
| Capacitor characteristics 115° C. Withstanding voltage | | A | B | A | B | A | C |
| Reliability | | B | C | C | D | C | D |

Example 7

In a laminated film including a surface layer (A layer) and an inner layer (B layer), an A raw material was used for the A layer, and a B raw material was used for the B layer. For the resin for the layer A, 98% by weight of the polypropylene resin manufactured by Prime Polymer Co., Ltd. with a mesopentad fraction of 0.984, a melting point of 168° C., a melt flow rate (MFR) of 2.2 g/10 min, and a cold xylene soluble component (hereinafter CXS) of 0.8% by mass, and 2% by weight of "TPX" (registered trademark): MX002 manufactured by Mitsui Chemicals, Inc. with a melting point of 224° C. as a polymethylpentene-based resin were blended, and kneaded and extruded with an extruder set at 260° C., and the strand was cooled with water and converted into chips to obtain a polypropylene resin raw material (A1). For the resin for the layer B, a resin raw material (B1) was used, which was composed of 100% by weight of the polypropylene resin manufactured by Prime Polymer Co., Ltd. with a mesopentad fraction of 0.984, a melting point of 168° C., a melt flow rate (MFR) of 2.2 g/10 min, and a cold xylene soluble component (hereinafter CXS) of 0.8% by mass. The resin raw material (A1) and the resin raw material (B1) were fed respectively to a single-screw melt extruder for the A layer and a single-screw melt extruder for the B layer, and melted at a resin temperature of 260° C., after removing foreign matter from the materials with a sintering filter cut into 80 μm, the amount of extrusion was adjusted with the use of a feed block such that three-layer lamination of A/B/A was 1/8/1 in lamination thickness ratio (the proportion of the A layer as a surface layer to the total film thickness was 20%), and the molten lamination polymer was discharged from a T-die. The molten sheet was cooled for solidification in closer contact with an air knife on a casting drum held at 25° C. to obtain an unstretched polypropylene film. The unstretched polypropylene film was preheated in a stepwise manner up to 84° C. with a plurality of roll groups, and subsequently passed through rolls maintained at 125° C. and provided with a difference in circumferential speed, and subjected to drawing 6.2 times in the longitudinal direction. Subsequently, the film was guided to a tenter, preheated at a TD preheating temperature of 167° C. (8° C. higher than the TD drawing temperature) with both ends held by clips in the film width, and then subjected to drawing 11.0 times in the width direction at a TD drawing temperature of 159° C. Furthermore, the film was subjected to, as the first-stage heat treatment and relaxation treatment, a heat treatment at 155° C. while applying 8% relaxation in the width direction, and further subjected to, as the second-stage heat treatment, a heat treatment at 140° C. with the film held by a clip in the width direction. Finally, as the third-stage heat treatment, the film was guided through a heat treatment at 120° C. to the outside of the tenter, the clip at the film end was released, the film surface (close to the casting drum contact surface) was then subjected to a corona discharge treatment at a treatment intensity of 25 W·min/m² in the atmosphere, thereby providing a polypropylene laminated film of 2.4 μm in film thickness. Table 2 shows the polypropylene laminated film characteristics and capacitor characteristics according to this example. The film was excellent in capacitor element processability, and excellent in both reliability and withstanding voltage as a capacitor.

Example 8

With the use of the raw material (A1) for the surface layer (A layer) according to Example 7, a single layer film was obtained. The raw material A1 was fed to a single-screw melt extruder, and melted at a resin temperature of 260° C., after removing foreign matter from the material with a sintering filter cut into 80 μm, the molten polymer was discharged from a T-die, and the molten sheet was cooled for solidification in closer contact with an air knife on a casting drum held at 25° C. to obtain an unstretched polypropylene film substantially composed of a single layer. The draw ratio for biaxially drawing the unstretched polypropylene film, the TD preheating, the TD stretching, and the heat treatment conditions were provided in the same manner as in Example 7, thereby providing a polypropylene film of 2.3 μm in thickness. Table 2 shows the polypropylene film characteristics and capacitor characteristics according to this example. The film was excellent in capacitor element processability, and also excellent in withstanding voltage as a capacitor, but the reliability was usable depending on conditions.

Example 9

In a laminated film including a surface layer (A layer) and an inner layer (B layer), for the resin for the layer A, 98% by weight of the polypropylene resin manufactured by Prime Polymer Co., Ltd. with a mesopentad fraction of 0.973, a melting point of 165° C., a melt flow rate (MFR) of 3.0 g/10 min, and a cold xylene soluble component (hereinafter CXS) of 1.3% by mass, and 2% by weight of "TPX" (registered trademark): MX002 manufactured by Mitsui Chemicals, Inc. with a melting point of 224° C. as a polymethylpentene-based resin were blended, and kneaded and extruded with an extruder set at 260° C., and the strand was cooled with water and turned into chips to obtain a polypropylene resin raw material (A2). For the resin for the layer B, a polypropylene resin was used, which was composed of 100% by mass of the polypropylene resin manufactured by Prime Polymer Co., Ltd. with a mesopentad fraction of 0.973, a melting point of 165° C., a melt flow rate (MFR) of 3.0 g/10 min, and a cold xylene soluble component (hereinafter CXS) of 1.3% by mass. In the same way as in Example 7 except for the temperature of the casting drum, draw ratio for biaxial drawing, TD preheating temperature, TD drawing temperature, and heat treatment conditions provided as shown in Table 2, a polypropylene laminated film of 2.4 μm in thickness was obtained. Table 2 shows the polypropylene laminated film characteristics and capacitor characteristics according to this example. The film was excellent in capacitor element processability, and slightly inferior in withstanding voltage and reliability as a capacitor on a practically acceptable level.

Example 10

The polypropylene used for the surface layer (A layer) according to Example 7 was blended with a polymethylpentene-based resin incompatible with the polypropylene such that the resin was 4% by weight, and kneaded and extruded with an extruder set at 260° C., and the strand was cooled with water and then turned into chips to provide a polypropylene resin raw material (A3). The inner layer (B layer) was also blended with an incompatible polymethylpentene-based resin such that the resin was 2% by weight, and kneaded and extruded with an extruder set at 260° C., and the strand was cooled with water and then turned into chips for the use of a polypropylene resin raw material (B2). Under the same conditions as in Example 7, a polypropylene laminated film of 2.4 μm in a thickness was obtained. Table 2 shows the polypropylene laminated film characteristics and capacitor characteristics according to this example. The film was excellent in capacitor element processability, and also excellent in withstanding voltage as a capacitor, but the reliability was usable depending on conditions.

Example 11

In a laminated film including a surface layer (A layer) and an inner layer (B layer), an A1 raw material was used for the A layer, and a B1 raw material was used for the B layer. In the same way as in Example 7 except that the film thickness was 6.0 μm, and the MD drawing ratio, and the TD preheating and drawing temperatures, and heat fixation temperature were changed to the conditions in Table 2, a polypropylene laminated film was obtained. Table 2 shows the polypropylene laminated film characteristics and capacitor characteristics according to this example. The film was excellent in capacitor element processability, and slightly inferior in withstanding voltage and reliability as a capacitor on a practically acceptable level.

Comparative Example 8

In a laminated film including a surface layer (A layer) and an inner layer (B layer), an A1 raw material was used for the A layer, and a B1 raw material was used for the B layer. In the same way as in Example 7 except that the temperature of the casting drum for cooling the molten-extruded sheet was adjusted to 95° C., the MD preheating temperature was adjusted to 120° C., the MD drawing temperature was adjusted to 140° C., the TD preheating temperature and the TD drawing temperature were adjusted to the same temperature, the area draw ratio was adjusted to 48 times, and the heat fixation temperature was adjusted only for one stage, a polypropylene laminated film of 2.4 µm in thickness was obtained. Table 2 shows the polypropylene laminated film characteristics and capacitor characteristics according to this Comparative Example 8. Concerning the capacitor element characteristics, the workability was excellent, while the withstanding voltage as a capacitor was insufficient on a practically intolerant level and, as for reliability, penetrating destruction in excess of ten layers was observed.

Comparative Example 9

In the raw material according to Example 7, the proportion of the thermoplastic resin incompatible with polypropylene was adjusted to 5% by weight, and a single-layer film was obtained. Blended were 95% by weight of the polypropylene resin manufactured by Prime Polymer Co., Ltd. with a mesopentad fraction of 0.984, a melting point of 168° C., a melt flow rate (MFR) of 2.2 g/10 min, and a cold xylene soluble component (hereinafter CXS) of 0.8% by mass, and 5% by weight of "TPX" (registered trademark: MX002, melting point: 224° C.) manufactured by Mitsui Chemicals, Inc. as a polymethylpentene-based resin, and the blend was kneaded and extruded with an extruder set at 260° C., and the strand was cooled with water and converted into chips to obtain a polypropylene resin raw material (A4). In the same way as in Example 7 except that the polypropylene resin (A4) was composed of a single layer, the heat treatment step was performed as a two-stage treatment, and the casting drum temperature and the conditions for film formation such as MD and TD drawing, were provided, a polypropylene film of 2.5 µm in thickness was obtained. From the polypropylene film characteristics and capacitor characteristics according to the comparative example as shown in Table 2, the capacitor element was favorable in workability, but inferior in withstanding voltage, also with reliability on a practically problematic level.

Comparative Example 10

In a laminated film including a surface layer (A layer) and an inner layer (B layer), for the surface layer (A layer) raw material, 98% by weight of the polypropylene resin manufactured by Prime Polymer Co., Ltd. with a mesopentad fraction of 0.967, a melting point of 164° C., a melt flow rate (MFR) of 3.1 g/10 min, and a cold xylene soluble component (hereinafter CXS) of 0.8% by mass, and 2% by weight of "TPX" (registered trademark): MX002 manufactured by Mitsui Chemicals, Inc. with a melting point of 224° C. as a polymethylpentene-based resin were blended, and kneaded and extruded with an extruder set at 260° C., and the strand was cooled with water and turned into chips to obtain a polypropylene resin raw material (A5). As for the raw material for the inner layer (B layer), the use of the polypropylene film which was composed of 100% by weight of the polypropylene resin manufactured by Prime Polymer Co., Ltd. of 0.967 as mentioned above, a melting point of 164° C., a melt flow rate (MFR) of 3.1 g/10 min, and a cold xylene soluble component (hereinafter CXS) of 0.8% by mass. In the same way as in Example 7 except for the temperature of the casting drum for cooling the molten extruded sheet, draw ratio for biaxial drawing, TD preheating temperature, TD drawing temperature, heat treatment conditions and the like provided as shown in Table 2, a polypropylene laminated film of 2.4 µm in thickness was obtained. From the polypropylene film characteristics and capacitor characteristics according to the comparative example as shown in Table 2, the capacitor element processability was excellent, but the withstanding voltage as a capacitor was low, and we found a change in element shape in the reliability evaluation on a practically intolerable level.

Comparative Example 11

In a laminated film including a surface layer (A layer) and an inner layer (B layer), for the surface layer (A layer) raw material, 98% by weight of the polypropylene resin manufactured by Prime Polymer Co., Ltd. with a mesopentad fraction of 0.965, a melting point of 163° C., a melt flow rate (MFR) of 3.5 g/10 min, and a cold xylene soluble component (hereinafter CXS) of 1.8% by mass, and 2% by weight of "TPX" (registered trademark): MX002 manufactured by Mitsui Chemicals, Inc. with a melting point of 224° C. as a polymethylpentene-based resin were blended, and kneaded and extruded with an extruder set at 260° C., and the strand was cooled with water and turned into chips to obtain a polypropylene resin raw material (A6). For the polypropylene resin for the inner layer (B layer), 100% by weight of the polypropylene resin manufactured by Prime Polymer Co., Ltd. of 0.967 as mentioned above, a melting point of 164° C., a melt flow rate (MFR) of 3.1 g/10 min, and a cold xylene soluble component (hereinafter CXS) of 0.8% by mass. In the same way as in Example 7 except for the use of the temperature of the casting drum for cooling the molten extruded sheet, draw ratio for biaxial drawing, TD preheating temperature, TD drawing temperature, heat treatment conditions and the like provided as shown in Table 1, a polypropylene film of 2.3 µm in thickness was obtained. From the polypropylene film characteristics and capacitor characteristics according to the comparative example as shown in Table 2, as for the capacitor element characteristics, the workability was excellent, while the withstanding voltage as a capacitor was insufficient on a practically intolerable level and, as for reliability, penetrating destruction in excess of ten layers was observed in the reliability evaluation.

TABLE 2

|  |  | Example 7 | Example 8 | Example 9 | Example 10 | Example 11 |
|---|---|---|---|---|---|---|
| Laminate configuration |  | A/B/A | Single layer | A/B/A | A/B/A | A/B/A |
| Content of resin incompatible with polypropylene in A layer | (% by mass) | 2 | 2 | 2 | 4 | 2 |
| Content of resin incompatible with polypropylene in B layer | (% by mass) | 0 |  | 0 | 2 | 0 |

TABLE 2-continued

| | | | | | | |
|---|---|---|---|---|---|---|
| Casting drum temperature | (° C.) | 25 | 25 | 26 | 25 | 25 |
| Mesophase fraction of unstretched film | (%) | 78 | 78 | 72 | 78 | 24 |
| Longitudinal draw ratio | (Times) | 6.2 | 6.2 | 6.4 | 6.2 | 5.5 |
| Lateral draw ratio | (Times) | 11.0 | 10.8 | 10.5 | 11.0 | 11.0 |
| Area magnification | (Times) | 68 | 67 | 67 | 68 | 55 |
| TD preheating temperature | (° C.) | 167 | 169 | 167 | 167 | 166 |
| TD drawing temperature | (° C.) | 159 | 160 | 159 | 159 | 158 |
| First stage heat treatment temperature | (° C.) | 155 | 156 | 157 | 155 | 155 |
| Second stage heat treatment temperature | (° C.) | 140 | 138 | 140 | 140 | 141 |
| Third stage heat treatment temperature | (° C.) | 120 | 122 | 115 | 120 | 121 |
| Elastic modulus of film surface | (GPa) | 2.8 | 2.7 | 2.6 | 2.7 | 2.6 |
| Sum of heat shrinkage rates in film longitudinal and width directions at 130° C. for 10 minutes | (%) | 3.4 | 3.5 | 4.6 | 4.1 | 4.8 |
| Mesophase fraction of film | (—) | 0.984 | 0.984 | 0.973 | 0.984 | 0.984 |
| Cold xylene soluble component (CXS) of film | (% by mass) | 0.8 | 0.8 | 1.3 | 0.8 | 0.8 |
| Difference between F80 value and F30 value in film longitudinal direction | (MPa) | 61 | 59 | 54 | 58 | 53 |
| Three-dimensional center plane average roughness SRa | (nm) | 41 | 44 | 37 | 49 | 47 |
| Three-dimensional ten-point average roughness SRz | (nm) | 227 | 255 | 295 | 452 | 421 |
| DSC 2ndRUN melting peak temperature ($T_{m2}$) | (° C.) | 168 | 166 | 165 | 166 | 167 |
| Heat of melting in range from 100° C. to 180° C in DSC 2ndRUN | (J/g) | 111 | 108 | 105 | 109 | 110 |
| Arithmetic mean height Sa | nm | 9.1 | 9.6 | 8.5 | 12.2 | 11.8 |
| Maximum height Sz | nm | 102 | 112 | 121 | 275 | 180 |
| Glossiness | (%) | 140 | 138 | 132 | 131 | 130 |
| DSC 1stRUN melting peak temperature ($T_{m1}$) | (° C.) | 178 | 176 | 173 | 175 | 172 |
| Film breakdown voltage at 130° C | (V/μm) | 469 | 448 | 422 | 438 | 415 |
| Coefficient of static friction (μs) | (—) | 0.65 | 0.62 | 0.68 | 0.58 | 0.63 |
| Film thickness | (μm) | 2.4 | 2.3 | 2.4 | 2.4 | 6.0 |
| Capacitor element workability | — | A | A | A | A | A |
| Capacitor characteristics 115° C. Withstanding voltage | | S | S | B | S | A |
| Reliability | | A | B | B | B | B |

| | | Comparative Example 8 | Comparative Example 9 | Comparative Example 10 | Comparative Example 11 |
|---|---|---|---|---|---|
| Laminate configuration | | A/B/A | Single layer | A/B/A | A/B/A |
| Content of resin incompatible with polypropylene in A layer | (% by mass) | 2 | 5 | 2 | 2 |
| Content of resin incompatible with polypropylene in B layer | (% by mass) | 0 | | 0 | 0 |
| Casting drum temperature | (° C.) | 95 | 30 | 25 | 25 |
| Mesophase fraction of unstretched film | (%) | 0 | 76 | 72 | 72 |
| Longitudinal draw ratio | (Times) | 4.8 | 5.5 | 6.2 | 5.9 |
| Lateral draw ratio | (Times) | 10.0 | 10.5 | 11.0 | 10.5 |
| Area magnification | (Times) | 48 | 58 | 68 | 62 |
| TD preheating temperature | (° C.) | 159 | 166 | 168 | 165 |
| TD drawing temperature | (° C.) | 159 | 158 | 159 | 158 |
| First stage heat treatment temperature | (° C.) | 154 | 155 | 155 | 160 |
| Second stage heat treatment temperature | (° C.) | — | 140 | 140 | 145 |
| Third stage heat treatment temperature | (° C.) | — | — | 120 | 110 |
| Elastic modulus of film surface | (GPa) | 2.5 | 2.3 | 2.3 | 2.2 |
| Sum of heat shrinkage rates in film longitudinal and width directions at 130° C. for 10 minutes | (%) | 5.4 | 5.1 | 4.7 | 5.2 |
| Mesophase fraction of film | (—) | 0.984 | 0.984 | 0.967 | 0.965 |
| Cold xylene soluble component (CXS) of film | (% by mass) | 0.8 | 0.8 | 0.8 | 1.8 |
| Difference between F80 value and F30 value in film longitudinal direction | (MPa) | 44 | 50 | 49 | 47 |
| Three-dimensional center plane average roughness SRa | (nm) | 72 | 66 | 46 | 49 |
| Three-dimensional ten-point average roughness SRz | (nm) | 560 | 492 | 285 | 266 |
| DSC 2ndRUN melting peak temperature ($T_{m2}$) | (° C.) | 167 | 168 | 164 | 163 |
| Heat of melting in range from 100° C. to 180° C in DSC 2ndRUN | (J/g) | 110 | 108 | 102 | 103 |
| Arithmetic mean height Sa | nm | 25.0 | 21.0 | 10.1 | 9.8 |
| Maximum height Sz | nm | 650 | 320 | 121 | 115 |
| Glossiness | (%) | 125 | 128 | 130 | 122 |
| DSC 1stRUN melting peak temperature ($T_{m1}$) | (° C.) | 172 | 173 | 171 | 170 |
| Film breakdown voltage at 130° C | (V/μm) | 370 | 407 | 401 | 381 |
| Coefficient of static friction (μs) | (—) | 0.61 | 0.62 | 0.61 | 0.63 |
| Film thickness | (μm) | 2.4 | 2.5 | 2.4 | 2.3 |
| Capacitor element workability | — | A | A | A | A |
| Capacitor characteristics 115° C. Withstanding voltage | | C | C | C | C |
| Reliability | | D | C | C | D |

The invention claimed is:

1. A polypropylene film, wherein
   (a) the film has a mesopentad fraction of 0.970 or more,
   (b) a polypropylene component dissolved in xylene (CXS) is less than 1.5% by mass with respect to a total mass of the film, after the film is completely dissolved in the xylene, and then precipitated at room temperature,
   (c) at least one surface of the film has a surface elastic modulus of 2.6 GPa or more, measured by nanoindentation measurement,
   (d) a sum of heat shrinkage rates in film longitudinal and width directions is 5% or less after a heat treatment at 130° C. for 10 minutes, and
   (e) a difference is 50 MPa or more between a stress at 80% elongation (F80 value) and a stress at 30% elongation (F30 value) in a longitudinal direction in a film tensile test.

2. The polypropylene film according to claim 1, wherein a melting peak temperature ($T_{m2}$) is 164° C. or higher when the film has a temperature increased from 30° C. to 260° C. at 20° C./min with a differential scanning calorimeter (DSC), then decreased from 260° C. to 30° C. at 20° C./min, and further increased again from 30° C. to 260° C. at 20° C./min, and total heat of melting in a range from 100° C. to 180° C. of the DSC curve is 105 J/g or higher.

3. The polypropylene film according to claim 2, wherein at least one surface of the film has an arithmetic mean height Sa of 5 to 20 nm and a maximum height Sz of 100 to 500 nm.

4. The polypropylene film according to claim 1, wherein at least one surface of the film has three-dimensional center plane average roughness SRa of 10 to 50 nm.

5. The polypropylene film according to claim 1, wherein at least one surface of the film has three-dimensional ten-point average roughness SRz of 50 to 500 nm.

6. The polypropylene film according to claim 1, wherein the film contains 0.1% by mass or more and 4% by mass or less of a thermoplastic resin that is incompatible with polypropylene.

7. The polypropylene film according to claim 6, wherein the film is a laminated film of two or more layers, and at least a surface layer (A layer) of the film contains a thermoplastic resin that is incompatible with polypropylene.

8. The polypropylene film according to claim 7, wherein the film is a laminated film of three or more layers, and the thermoplastic resin incompatible with the polypropylene of the surface layer (A layer) is higher in content than the inner layer (B layer).

9. The polypropylene film according to claim 6, wherein the incompatible thermoplastic resin is polymethylpentene.

10. The polypropylene film according to claim 6, wherein at least one surface of the film has glossiness of 130% or more and less than 150%.

11. The polypropylene film according to claim 1, wherein the film has a melting peak temperature ($Tm_1$) of 174° C. or higher, when the film has a temperature increased from 30° C. to 260° C. at 20° C./min with a differential scanning calorimeter (DSC).

12. The polypropylene film according to claim 1, wherein the film thickness is 0.5 μm or more and 10 μm or less.

13. A metal layer laminated film wherein a metal film is provided on at least one surface of the polypropylene film according to claim 1.

14. A film capacitor comprising the metal layer laminated film according to claim 13.

* * * * *